US011769491B1

(12) United States Patent
Bafna et al.

(10) Patent No.: US 11,769,491 B1
(45) Date of Patent: Sep. 26, 2023

(54) PERFORMING UTTERANCE DETECTION USING CONVOLUTION

(71) Applicant: Amazon Technologies, Inc., Seattle, WA (US)

(72) Inventors: Abhishek Bafna, Seattle, WA (US); Haithem Albadawi, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 141 days.

(21) Appl. No.: 17/036,091

(22) Filed: Sep. 29, 2020

(51) Int. Cl.
*G10L 15/16* (2006.01)
*G10L 15/02* (2006.01)
*G06N 3/08* (2023.01)
*G10L 15/08* (2006.01)
*G06N 3/048* (2023.01)

(52) U.S. Cl.
CPC ............. *G10L 15/16* (2013.01); *G06N 3/048* (2023.01); *G06N 3/08* (2013.01); *G10L 15/02* (2013.01); *G10L 2015/088* (2013.01)

(58) Field of Classification Search
CPC ... G10L 15/16; G10L 15/02; G10L 2015/088; G06N 3/08; G06N 3/0481
See application file for complete search history.

(56) References Cited

U.S. PATENT DOCUMENTS

| 10,424,289 B2 * | 9/2019 | Kalinli-Akbacak .... G10L 15/04 |
| 2015/0095027 A1 * | 4/2015 | Parada San Martin ..................... G06N 3/045 704/255 |
| 2016/0284347 A1 * | 9/2016 | Sainath .................. G10L 15/16 |
| 2017/0092297 A1 * | 3/2017 | Sainath .................. G10L 25/78 |
| 2018/0174576 A1 * | 6/2018 | Soltau ..................... G10L 15/02 |
| 2019/0043529 A1 * | 2/2019 | Muchlinski ............. G10L 15/22 |

OTHER PUBLICATIONS

Sigtia, S., Haynes, R., Richards, H., Marchi, E., & Bridle, J. (Sep. 2018). Efficient Voice Trigger Detection for Low Resource Hardware. In Interspeech (pp. 2092-2096). (Year: 2018).*
Chakrabarty, Debmalya, and Mounya Elhilali. "A Gestalt inference model for auditory scene segregation." PLoS computational biology 15.1 (2019) (Year: 2019).*
Sigtia, Siddharth, Rob Haynes, Hywel Richards, Erik Marchi, and John Bridle. "Efficient Voice Trigger Detection for Low Resource Hardware." In Interspeech, pp. 2092-2096. 2018 (Year: 2018).*

* cited by examiner

*Primary Examiner* — Bhavesh M Mehta
*Assistant Examiner* — Nandini Subramani
(74) *Attorney, Agent, or Firm* — PIERCE ATWOOD LLP

(57) ABSTRACT

A system configured to perform utterance detection using data processing techniques that are similar to those used for object detection is provided. For example, the system may treat utterances within audio data as analogous to an object represented within an image and employ techniques to separate and identify individual utterances. The system may include one or more trained models that are trained to perform utterance detection. For example, the system may include a first module to process input audio data and identify whether speech is represented in the input audio data, a second module to apply convolution filters, and a third module configured to determine a boundary identifying a beginning and ending of a portion of the input audio data along with an utterance score indicating how closely the portion of the input audio data represents an utterance.

21 Claims, 13 Drawing Sheets

Utterance Detection
520

Input Audio Feature Data
530

Temporal Feature Data
540

No Speech
Speech

Spatial Data
550

No Speech
Speech

Utterance Data
560

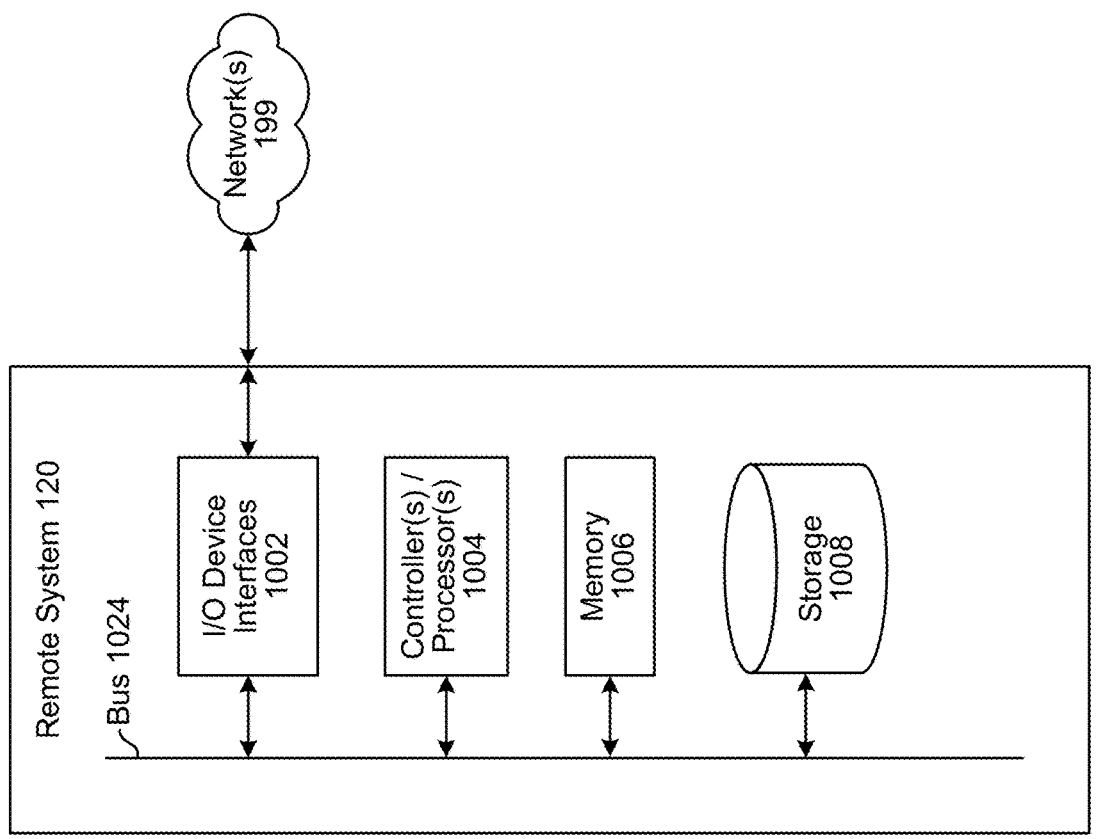

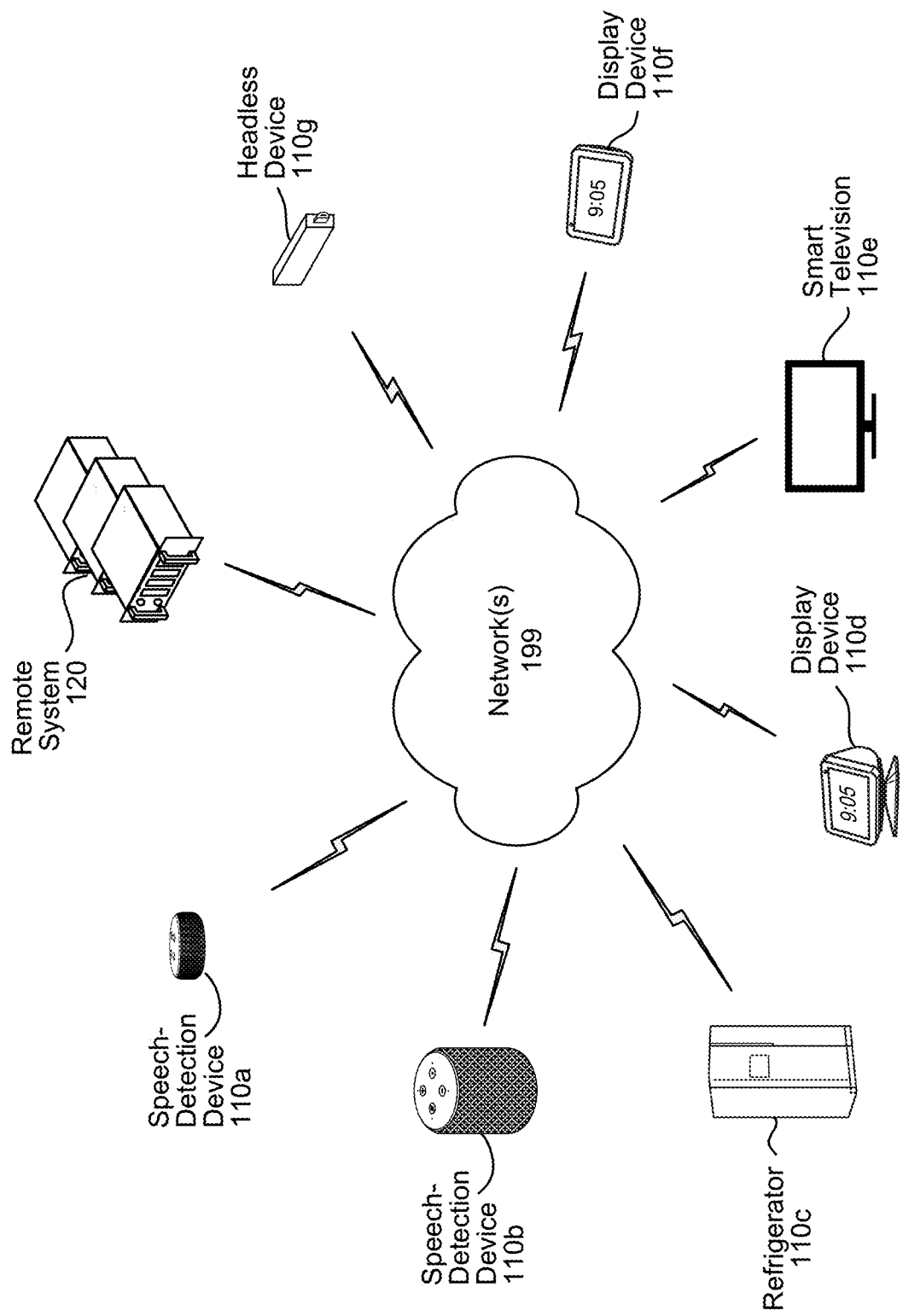

PERFORMING UTTERANCE DETECTION USING CONVOLUTION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 10 is a block diagram conceptually illustrating example components of a remote system according to embodiments of the present disclosure.

FIG. 11 illustrates an example of a computer network for use with a speech processing system.

DETAILED DESCRIPTION

Electronic devices may be used to capture audio and process audio data. The audio data may be processed to identify voice commands and/or to provide feedback information to a user. As part of processing the audio data, the device may perform utterance detection and separate portions of the audio data corresponding to individual utterances represented in the audio data. Typically, utterance detection is a computationally expensive process that determines an end point of an utterance using an automatic speech recognition (ASR) component. As the language models used by the ASR component are large in size, this may result in higher latency and memory requirements. In addition, the ASR component does not typically determine a beginning of the utterance as the beginning of the utterance may be determined using alternative techniques, such as by detecting a wakeword or receiving an input command (e.g., button press).

To improve utterance detection by reducing a latency, memory requirements, and/or processing consumption associated with performing utterance detection, devices, systems and methods are disclosed that perform utterance detection using data processing techniques that are similar to those used for object detection. For example, a device may treat utterances within the audio data as analogous to an object represented within an image and employ techniques to separate and identify individual speech segments (e.g., utterances). As described in greater detail below with regard to FIGS. 2A-2B, the device may include one or more trained models that comprise three modules: a first module to process input audio data and identify whether speech is represented in the input audio data, a second module to perform spatial embedding and generate spatial features, and a third module configured to determine a boundary identifying a beginning/end of a portion of the input audio data along with an utterance score indicating how closely the portion of the input audio data represents an utterance. In contrast to normal utterance detection, the third module is capable of detecting overlapping utterances, resulting in multiple boundaries that may also overlap.

Figure 1:
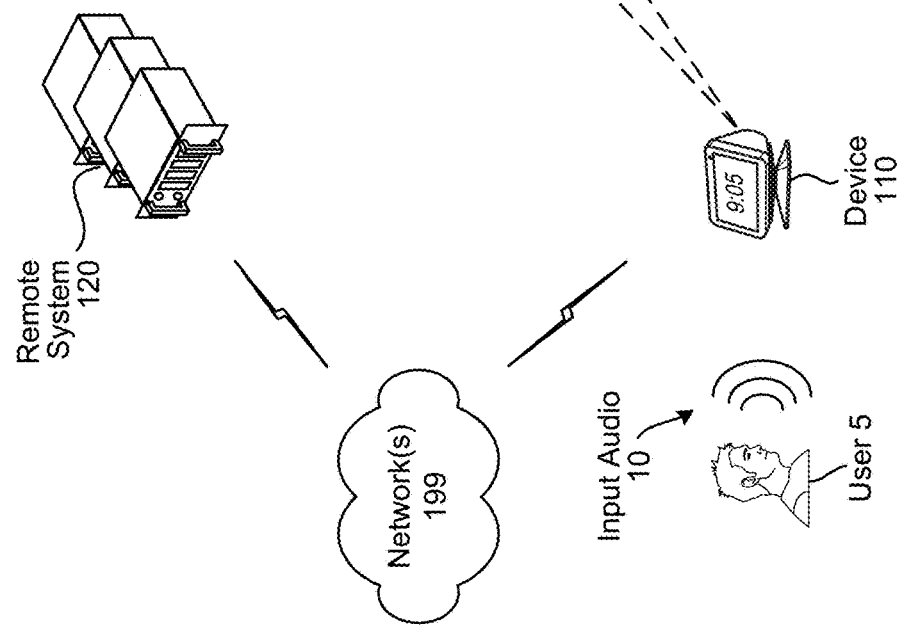
FIG. 1 illustrates a system configured to perform utterance detection according to embodiments of the present disclosure.

FIG. 1 illustrates a high-level conceptual block diagram of a system 100 configured to perform utterance detection using data processing techniques that are similar to those used for object detection. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 and a remote system 120 and the device 110 may communicate with the remote system via network(s) 199.

The device 110 may be an electronic device configured to capture and/or receive audio data representing input audio 10 generated by a user 5. For example, the device 110 may include a microphone array configured to generate audio data, although the disclosure is not limited thereto and the device 110 may include multiple microphones without departing from the disclosure. Additionally or alternatively, the device 110 may receive audio data from another device without departing from the disclosure. For example, the device 110 may be communicatively coupled to an accessory device (not illustrated) that includes one or more microphones configured to generate the audio data. As is known and used herein, "capturing" an audio signal and/or generating audio data includes a microphone transducing audio waves (e.g., sound waves) of captured sound to an electrical signal and a codec digitizing the signal to generate the microphone audio data.

As described in greater detail below with regard to FIG. 8, in some examples the remote system 120 may be configured to perform natural language processing (NLP) to determine actions responsive to input commands received from the user 5 without departing from the disclosure. For example, the remote system 120 may process audio data received from the device 110 to determine an action to perform that is responsive to a voice command represented in the audio data. However, the disclosure is not limited thereto and the remote system 120 may receive input commands using any techniques known to one of skill in the art without departing from the disclosure. Additionally or alternatively, the device 110 may be configured to perform natural language processing to determine actions responsive to input commands received from the user 5 without departing from the disclosure.

As part of processing the audio data, the device 110 may perform utterance detection to identify one or more utterances represented in the audio data. By identifying the one or more utterances, the device 110 may segment the audio data and process individual segments of the audio data separately. For example, the device 110 may generate a portion of audio data representing an utterance that corresponds to a voice command and may process the portion of the audio data in order to perform an action responsive to the voice command. However, the disclosure is not limited thereto, and in other examples the device 110 may generate a first portion of audio data representing a first utterance and a second portion of audio data representing a second utterance and may perform additional processing to both the first portion of the audio data and the second portion of the audio data. For example, the device 110 may separate individual utterances represented in the audio clip and perform sentiment detection and/or other processing for each of the individual utterances. Thus, the device 110 may provide the user 5 with information about a tone or sentiment (e.g., does the user 5 sound happy, sad, excited, angry, etc.) of a conversation.

The device 110 may perform utterance detection to identify a beginning and/or an ending of an utterance represented in the audio data. In some examples, the device 110 may determine a boundary for an individual utterance, which may indicate a beginning (e.g., start point) and/or an ending (e.g., end point) of the utterance within the audio data. For example, the device 110 may detect the beginning of the utterance (e.g., when the utterance is first represented in the audio data) and identify a first time that corresponds to the start point. Similarly, the device 110 may detect the ending of the utterance (e.g., when the utterance is last represented in the audio data) and identify a second time that corresponds to the end point. The device 110 may determine the first time and the second time using a global time reference (e.g., time or timestamp associated with a global clock used by the device 110), a relative time reference (e.g., time or timestamp associated with a length of an audio clip represented by the audio data), a relative frame reference (e.g., individual audio frame in a series of audio frames included in the audio data), and/or the like without departing from the disclosure.

In some examples, the device 110 may determine a boundary including both a beginning and an ending for each utterance. For example, the device 110 may process audio data corresponding to an entire conversation (e.g., a relatively long audio clip) and may identify boundaries for multiple utterances represented in the audio data. As the device 110 is capable of detecting overlapping utterances, multiple boundaries may also overlap without departing from the disclosure. Using these boundaries, the device 110 may segment the audio data and generate separate audio data corresponding to each of the multiple utterances, although the disclosure is not limited thereto. The disclosure is not limited thereto, however, and the device 110 may determine a boundary including only a beginning or an ending for an utterance without departing from the disclosure. For example, the device 110 may determine a provisional boundary that indicates a beginning of an utterance prior to the device 110 detecting an ending of the utterance, although the disclosure is not limited thereto.

Instead of determining a boundary for individual utterances, in some examples the device 110 may determine a transition point associated with an utterance (e.g., utterance transition). For example, the device 110 may identify a beginning of an utterance and generate utterance data indicating that a new utterance began without indicating a specific time associated with the beginning of the utterance and/or tracking individual utterances. Additionally or alternatively, the device 110 may identify an ending of the utterance and generate utterance data indicating that the utterance ended without indicating a specific time associated with the ending of the utterance and/or tracking individual utterances.

To illustrate an example, the device 110 may continuously process input audio data by processing portions of the input audio data as the portions are generated or received by the device 110. When the device 110 detects an utterance transition, the device 110 may generate utterance data indicating a type of utterance transition (e.g., begin point or end point) and may process the input audio data based on the utterance transition. For example, the device 110 may separate the input audio data into portions of input audio data without determining formal boundaries for each of multiple utterances represented in the input audio data. In some examples, the device 110 may identify multiple utterances that overlap without departing from the disclosure. For example, the device 110 may generate first utterance data indicating a beginning of a first utterance, second utterance data indicating a beginning of a second utterance, and then third utterance data indicating an end of the first utterance. Thus, the device 110 may use utterance transition points to track multiple utterances at a time without departing from the disclosure.

Typically, utterance detection is a computationally expensive process that determines an end point of an utterance using an automatic speech recognition (ASR) component. For example, the ASR component may recognize the phones in speech and probabilistically determine the end of phrases, although the disclosure is not limited thereto. As the language models used by the ASR component are large in size, this may result in higher latency and memory requirements. In addition, the ASR component does not typically determine a beginning of the utterance as the beginning of the utterance may be determined using alternative techniques, such as by detecting a wakeword or receiving an input command (e.g., button press).

To improve utterance detection by reducing a latency, memory requirements, and/or processing consumption associated with performing utterance detection, the device 110 may perform utterance detection using data processing techniques that are similar to those used for object detection. For example, the device 110 may treat utterances within the audio data as analogous to an object represented within an image and employ techniques to separate and identify individual speech segments (e.g., utterances). As described in greater detail below with regard to FIGS. 2A-2B, the device 110 may include one or more trained models that comprise three modules: a first module to process input audio data and identify whether speech is represented in the input audio data, a second module to perform spatial embedding and generate spatial features, and a third module configured to determine a boundary identifying a beginning/end of a portion of the input audio data along with an utterance score indicating how closely the portion of the input audio data represents an utterance. As the device 110 is capable of detecting overlapping utterances, multiple boundaries may also overlap without departing from the disclosure.

To begin performing utterance detection, the device 110 may receive (130) first audio data. In some examples, the device 110 may receive the first audio data from one or more microphones in a microphone array associated with the device 110. However, the disclosure is not limited thereto, and in other examples the device 110 may receive the first audio data from peripheral components associated with the device 110, such as smart accessories that are communicatively coupled to the device 110 (e.g., smart watch or the like).

The device 110 may generate (132) first data representing audio features of the first audio data. For example, the device 110 may determine a number of values, called features, representing the qualities of input audio data 205, along with a set of those values, called a feature vector or audio feature vector (e.g., feature vector data, vector data, etc.), representing the features/qualities of the input audio data 205 within an audio frame (e.g., frame of audio data) for a particular frequency band.

In some examples, the audio features may be represented as log-filterbank energy (LFBE) acoustic features, although the disclosure is not limited thereto. To illustrate an example, the first data may represent a portion of audio data having a first length (e.g., 5-10 ms) using a first number (e.g., N) of audio features (e.g., 128 or 256 audio features, although the disclosure is not limited thereto) correspond to individual frequency bands. For example, for every 10 ms of the input audio data 205, the device 110 may generate an array of 128 audio features (e.g., 128 individual frequency bands) using an analysis window (e.g., moving window) having a second length (e.g., 25 ms). However, while FIG. 1 illustrates an example of the device 110 generating first data representing audio features, the disclosure is not limited thereto. In some examples, the device 110 may process the first audio data directly without generating the first data. For example, the first data may represent raw audio data (e.g., bit values) corresponding to the input audio data 205 without departing from the disclosure.

Additionally or alternatively, the device 110 may generate the LFBE acoustic features and then calculate additional audio features using the LFBE acoustic features. For example, the LFBE acoustic features may correspond to first features that represent a short term power spectrum for a plurality of frequency bands within the input audio data (e.g., K frequency bands). Using the LFBE acoustic features, the device 110 may perform transforms to calculate second features that may characterize portions of the input audio data. For example, the device 110 may generate L second features, and an individual feature of the second features may correspond to multiple frequency bands within an audio frame and/or the entire audio frame. Thus, the first data may correspond to the first features (e.g., N=K), the first features and the second features, (e.g., N=K+L), and/or the like without departing from the disclosure.

The device 110 may generate (134) second data by processing the first data to extract information that may assist in utterance detection. In some examples, the device 110 may generate the second data by processing the first data using a trained model. As used herein, a trained model may refer to a machine learning model, a neural network (e.g., long-short term memory (LSTM) neural network), and/or the like without departing from the disclosure. For example, the device 110 may use a trained model to perform temporal extraction of features (e.g., embed temporal features or temporal feature data), identify areas that represent an increase or decrease in pitch, generate speech frame data indicating whether speech is represented, and/or the like. In some examples, the device 110 may classify individual audio frames (e.g., on an audio frame level) to identify if speech is detected in each individual audio frame, although the disclosure is not limited thereto. Thus, the device 110 may use the first data representing audio features to generate second data representing temporal features associated with the audio features.

As described above, the first data may correspond to a first number N of audio features. If the first data is represented as a column vector, the first data may have first dimensions (e.g., N×1), indicating that the first data includes N rows of values in a single column, although the disclosure is not limited thereto. The device 110 may process the first data to generate the second data, which may also include N rows (e.g., one value for each frequency range or frequency bin). However, the second data may have second dimensions (e.g., N×D), indicating that the second data includes N rows of D columns. For example, the trained model may include multiple filters and the second data may include a separate column for each of the multiple filters (e.g., each filter in an LSTM neural network). Thus, the second dimensions depend on the number of filters included in the trained model, with each filter performing different operation(s) and/or extracting different information from the first data.

While FIG. 1 illustrates the device 110 processing the first data to generate the second data, the disclosure is not limited thereto and in some examples the device 110 may process the first audio data directly without generating the first data. Additionally or alternatively, in some examples the device 110 may process the first data and the first audio data to generate the second data. For example, the device 110 may append the first audio data to the first data to provide additional information, although the disclosure is not limited thereto.

The device 110 may use the second data to generate (136) third data. For example, the device 110 may include one or more convolution layers and may generate the third data by applying convolution operations (e.g., convolution filters) to the second data. Thus, the device 110 may generate the third data using data processing techniques that are similar to those used for object detection, except that instead of detecting object(s) using spatial features that correspond to image data and are associated with two dimensions (e.g., horizontal coordinates and vertical coordinates of the image data), the device 110 may detect utterance(s) using temporal features that correspond to audio data and are associated with a single dimension (e.g., time).

Typically, convolution filters are configured to identify continuities, such as repeated patterns within data. For example, first convolution filters used in object detection may look for similarities in image data using spatial embedding, such as similarities in texture and color. Based on these similarities, the first convolution filters may group areas together and form a bounding box around portions of the image data representing an object. Similarly, second convolution filters used in utterance detection may look for similarities in audio features using temporal embedding (e.g., temporal features), such as similarities in pitch, continuity in speech, and/or the like. Based on these similarities, the second convolution filters may group audio features together and form a boundary around portions of the audio data representing an utterance.

In some examples, the device 110 may apply a series of F convolution filters to the second data to generate the third data. As described above, the second data may have second dimensions (e.g., N×D), indicating that the second data includes N rows of D columns. The third data may also include N rows (e.g., one value for each frequency range or frequency bin), but may have third dimensions (e.g., N×F), indicating that the third data includes N rows of F columns. For example, the third data may include a separate column for each of the F convolution filters, such that the third dimensions depend on the number of convolution filters, with each filter performing different operation(s) and/or extracting different information from the second data.

While the trained model used to generate the second data calculates features within an individual frame of audio (e.g., audio frame), the convolution filters work across multiple audio frames. For example, while the features represented in the second data may be influenced by a neighboring audio frame, each feature is individually computed for a single audio frame. In contrast, the convolution filters generate spatial features that span across a variable number of audio frames. For example, individual convolution filters may correspond to different lengths (e.g., different number of audio frames), such that a first convolution filter may have a first length (e.g., first feature calculated using a first number of audio frames) while a second convolution filter may have a second length (e.g., second feature calculated using a second number of audio frames). Thus, the third data includes additional information about how the audio features are grouped together (e.g., where they start/end, heatmap information, and/or the like), although the disclosure is not limited thereto.

The device 110 may process (138) the third data to determine a boundary associated with an utterance. For example, the device 110 may determine the boundary by identifying a beginning and/or an ending of the utterance represented in the first audio data. In addition, the device 110 may process (140) the third data to determine an utterance score corresponding to the boundary. For example, the utterance score may indicate a likelihood that a portion of the first audio data indicated by the boundary actually represents an utterance. While FIG. 1 illustrates an example of identifying a single utterance and generating a single boundary, the disclosure is not limited thereto. Instead, the device 110 may identify multiple utterances and/or generate multiple boundaries, some of which may overlap, without departing from the disclosure.

After determining the boundary and the utterance score, the device 110 may determine (142) that the utterance score satisfies a condition that an utterance is represented in the first audio data. For example, the utterance score may exceed a threshold value, indicating a strong likelihood that an utterance is represented in the portion of the first audio data. The device 110 may then generate (144) second audio data representing the utterance and cause (146) an action to be performed with the second audio data. For example, the device 110 may extract the portion of the first audio data to generate the second audio data and may perform natural language processing on the second audio data to determine a voice command. Additionally or alternatively, the device 110 may send the second audio data to the remote system 120 for natural language processing. However, the disclosure is not limited thereto, and the device 110 and/or the remote system 120 may perform any type of processing on the second audio data without departing from the disclosure. For example, the device 110 and/or the remote system 120 may perform sentiment detection on the second audio data without departing from the disclosure.

While FIG. 1 illustrates an example in which the device 110 may generate second audio data representing the utterance, the disclosure is not limited thereto. In some examples, the device 110 may use the boundary to process the first audio data without generating the second audio data without departing from the disclosure. For example, the device 110 may perform sentiment detection on a portion of the first audio data indicated by the boundary. Additionally or alternatively, the device 110 may process non-audio data that corresponds to the utterance without departing from the disclosure. For example, the device 110 may generate feature data representing the utterance and cause natural language processing to be performed on the feature data (e.g., the device 110 may perform natural language processing and/or send the feature data to the remote system 120 to perform natural language processing) without departing from the disclosure.

Figure 2A:
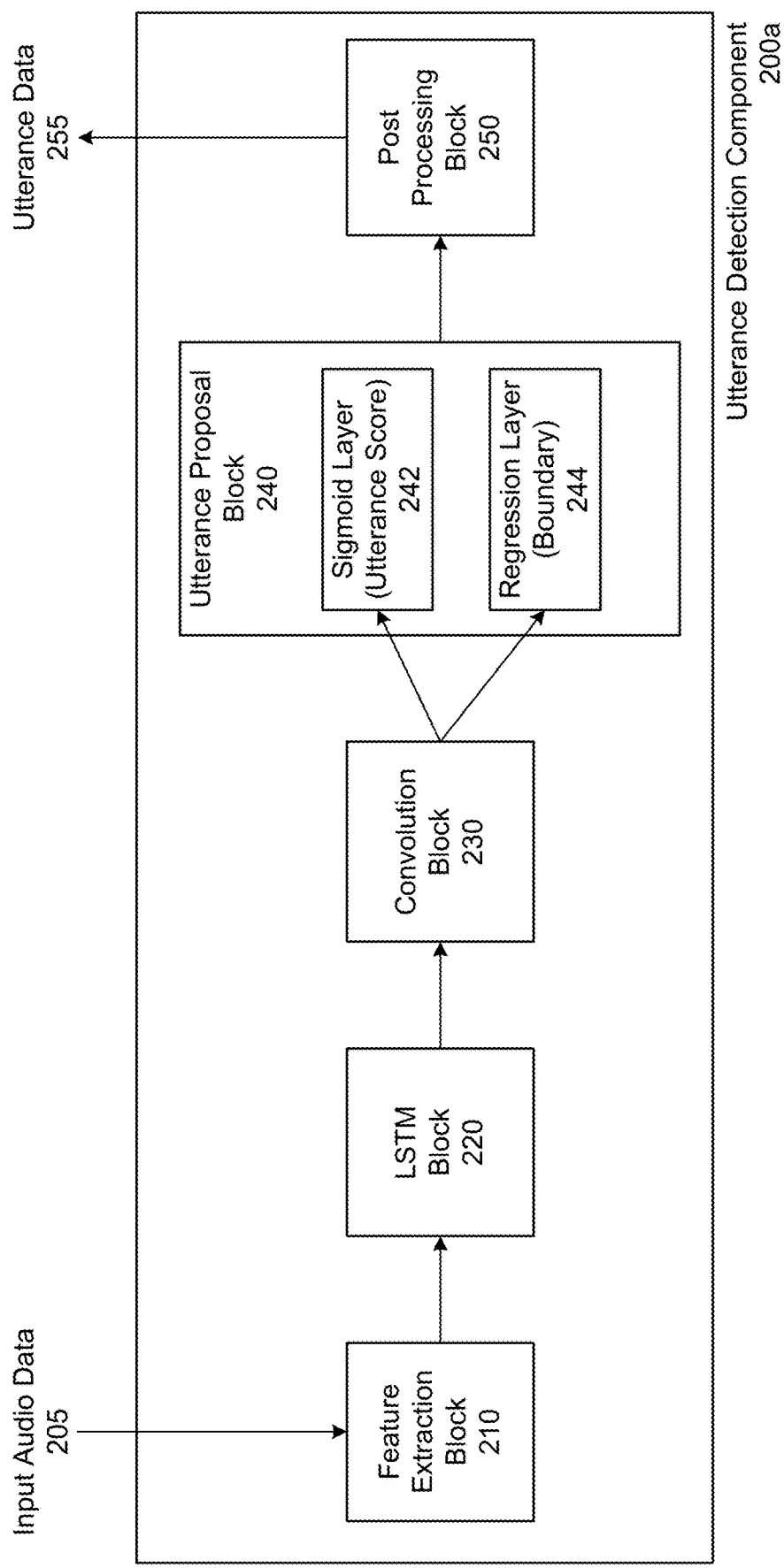
FIGS. 2A-2B illustrate example component diagrams of an utterance detection system according to examples of the present disclosure.
Figure 2B:
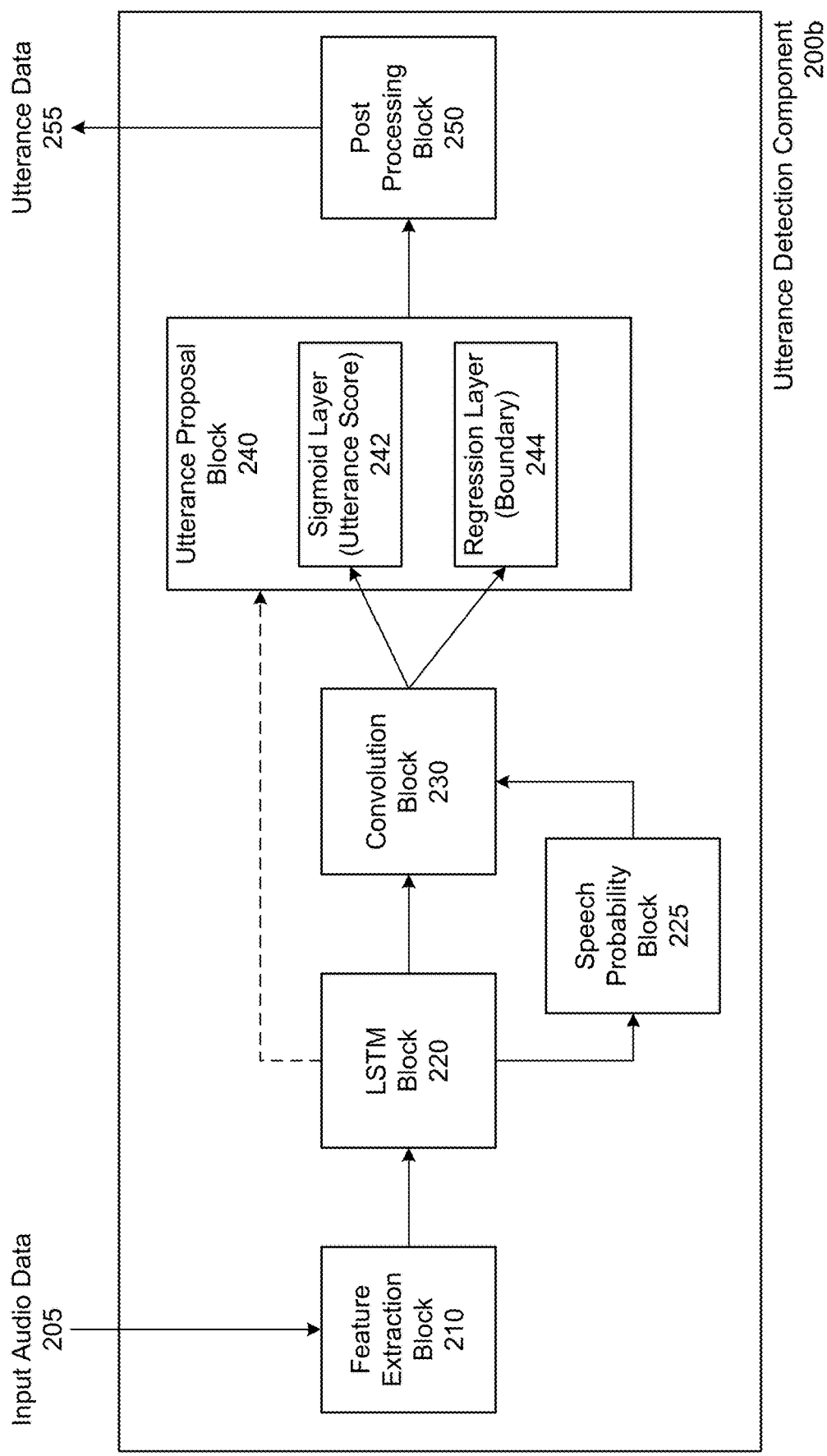

FIGS. 2A-2B illustrate example component diagrams of an utterance detection system according to examples of the present disclosure. As illustrated in FIGS. 2A-2B, an utterance detection component 200 may include several processing blocks, such as a feature extraction block 210, a long short-term memory (LSTM) block 220, a convolution block 230, an utterance proposal block 240, and a post processing block 250. In some examples, the utterance detection component 210 may optionally include a speech probability block 225, described in greater detail below with regard to a second utterance detection component 200b illustrated in FIG. 2B. While a conceptual example of processing performed by each of these blocks is described below, the disclosure is not limited thereto and these blocks may vary without departing from the disclosure.

As illustrated in FIG. 2A, a first utterance detection component 200a may receive input audio data 205 and may process the input audio data 205 using the feature extraction block 210. In some examples, the device 110 may determine a number of values, called features, representing the qualities of the input audio data 205, along with a set of those values, called a feature vector or audio feature vector (e.g., feature vector data, vector data, etc.), representing the features/qualities of the input audio data 205 within an audio frame (e.g., frame of audio data) for a particular frequency band. For example, the feature extraction block 210 may extract audio features to generate first data that may include one or more feature vectors corresponding to the input audio data 205.

In some examples, the first data may represent audio features that are audio frame-level features, such as filter-bank energy (FBE) features, log filterbank energy (LFBE) features, mel-frequency cepstral coefficient (MFCC) features, and/or the like. For example, these audio features may represent a short term power spectrum associated with a moving window of the audio data, although the disclosure is not limited thereto. These audio features are physically meaningful quantities that may be beneficial when applying human auditory processing such as masking. Many different features may be determined without departing from the disclosure, and each feature represents some quality of the audio that may be useful for speech processing. A number of approaches may be used by the device 110 to process the input audio data 205, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

To illustrate an example, the first data may represent a portion of the input audio data 205 having a first length (e.g., 5-10 ms) using a first number (e.g., N) of audio features (e.g., 128 or 256 audio features, although the disclosure is not limited thereto) correspond to individual frequency bands. For example, for every 10 ms of the input audio data 205, the device 110 may generate an array of 128 audio features (e.g., 128 individual frequency bands) using an analysis window (e.g., moving window) having a second length (e.g., 25 ms). However, while FIG. 2A-2B illustrate examples of the feature extraction block 210 generating first data representing audio features, the disclosure is not limited thereto. In some examples, the LSTM block 220 may process the input audio data 205 directly without generating the first data. For example, the first data may represent raw audio data (e.g., bit values) corresponding to the input audio data 205 without departing from the disclosure.

Additionally or alternatively, the device 110 may generate the LFBE acoustic features and then calculate additional audio features using the LFBE acoustic features. For example, the LFBE acoustic features may correspond to first features that represent a short term power spectrum for a plurality of frequency bands within the input audio data (e.g., K frequency bands). Using the LFBE acoustic features, the device 110 may perform transforms to calculate second features that may characterize portions of the input audio data. For example, the device 110 may generate L second features, and an individual feature of the second features may correspond to multiple frequency bands within an audio frame and/or to the entire audio frame. Thus, the first data may correspond to the first features (e.g., N=K), the first features and the second features, (e.g., N=K+L), and/or the like without departing from the disclosure.

The feature extraction block 210 may output the first data to the LSTM block 220. As illustrated in FIGS. 2A-2B, the LSTM block 220 may be a neural network, such as a recurrent neural network (RNN). For example, connections between nodes in the LSTM block 220 may form a directed graph along a temporal sequence, which allows the LSTM block 220 to exhibit temporal dynamic behavior. This makes the LSTM block 220 well-suited to classifying, processing, and making predictions based on time series data, despite lags of unknown duration. However, the disclosure is not limited thereto, and the LSTM block 220 may correspond to any trained model without departing from the disclosure.

In context of the utterance detection component 200, the LSTM block 220 may be configured to generate temporal embedding from the audio features represented in the first data. As used herein, generating temporal embedding may correspond to extracting temporal information from the audio features, which may be referred to as generating temporal features corresponding to the audio features. For example, the LSTM block 220 may learn basis properties at a frame-level, perform temporal extraction of features (e.g., embed temporal features or temporal feature data), identify areas that represent an increase or decrease in pitch, generate speech frame data indicating whether speech is represented, and/or the like without departing from the disclosure.

In some examples, the LSTM block 220 may classify individual audio frames (e.g., on an audio frame level) to identify if speech is detected in each individual audio frame, although the disclosure is not limited thereto. For example, the temporal features generated by the LSTM block 220 may indicate whether speech is represented in individual audio frames. To illustrate an example, the temporal features may indicate that speech is not represented in a first audio frame, that speech is represented in a second audio frame, that speech is represented in a third audio frame, and so on, although the disclosure is not limited thereto. In some examples, the temporal features generated by the LSTM block 220 may correspond to a heatmap of where speech is detected, although the disclosure is not limited thereto.

The LSTM block 220 may receive the first data representing audio features that is generated by the feature extraction block 210 and may generate second data representing temporal features associated with the audio features. For example, the LSTM block 220 may consume a portion of the first data corresponding to an audio frame (e.g., short segment of audio, typically in the order of 10 milliseconds, although the disclosure is not limited thereto) and may predict whether that audio frame corresponds to speech (e.g., speech is represented in the audio frame of the input audio data 205) or no speech (e.g., speech is not represented in the audio frame of the input audio data 205).

As described above, the first data may correspond to a first number N of audio features. If the first data is represented as a column vector, the first data may have first dimensions (e.g., N×1), indicating that the first data includes N rows of values in a single column, although the disclosure is not limited thereto. The LSTM block 220 may process the first data to generate the second data, which may also include N rows (e.g., one value for each frequency range or frequency bin). However, the second data may have second dimensions (e.g., N×D), indicating that the second data includes N rows of D columns. For example, the LSTM block 220 may include multiple filters and the second data may include a separate column for each of the multiple filters (e.g., each filter in the LSTM block 220). Thus, the second dimensions depend on the number of filters included in the LSTM block 220, with each filter performing different operation(s) and/or extracting different information from the first data.

While FIGS. 2A-2B illustrate the LSTM block 220 processing the first data to generate the second data, the disclosure is not limited thereto and in some examples the LSTM block 220 may process the input audio data 205 directly instead of the first data. Additionally or alternatively, in some examples the LSTM block 220 may process the first data and the input audio data 205 to generate the second data. For example, the feature extraction block 210 may append the input audio data 205 to the first data to provide additional information, although the disclosure is not limited thereto.

In some examples, the LSTM block 220 may process audio frames individually over time (e.g., streaming processing). For example, the LSTM block 220 may receive a first portion of the first data corresponding to a first input audio frame and generate a first portion of the second data corresponding to a first output audio frame, receive a second portion of the first data corresponding to a second input audio frame and generate a second portion of the second data corresponding to a second output audio frame, and so on, processing individual audio frames as they are generated. However, the disclosure is not limited thereto, and the LSTM block 220 may process a group of audio frames (e.g., batch processing) without departing from the disclosure. For example, the LSTM block 220 may receive a portion of the first data corresponding to multiple input audio frames and generate a portion of the second data corresponding to multiple output audio frames without departing from the disclosure.

In some examples, the LSTM block 220 may output the second data directly to the convolution block 230 for convolution processing. For example, FIG. 2A illustrates a conceptual example of a first utterance detection component 200a in which the LSTM block 220 outputs the second data directly to the convolution block 230. Thus, the convolution block 230 may process the temporal features (e.g., temporal embeddings) without departing from the disclosure.

In other examples, the LSTM block 220 may output the second data to an intermediary block without departing from the disclosure. For example, FIG. 2B illustrates a conceptual example of a second utterance detection component 200b in which the LSTM block 220 outputs the second data to a speech probability block 225 in addition to the convolution block 230. In this example, the speech probability block 225 may be configured to generate a probability value (e.g., value between 0 and 1) indicating a likelihood that a particular audio frame represents speech. Thus, the speech probability block 225 may convert the temporal features represented in the second data to probability values and send the probability values to the convolution block 230. In the second utterance detection component 220b, the convolution block 230 may process the temporal features (e.g., temporal embeddings) and/or the probability values without departing from the disclosure.

In some examples, the speech probability block 225 may correspond to a softmax layer that converts the temporal features to a probability value indicating a likelihood that speech is represented in an individual audio frame. For example, the speech probability block 225 may perform a softmax function (e.g., normalized exponential function) that receives an input (e.g., vector of K real numbers) and normalizes the input into a probability distribution consisting of K probabilities proportional to the exponentials of the input numbers. Additionally or alternatively, the speech probability block 225 may correspond to a sigmoid layer without departing from the disclosure.

To conceptually illustrate the different implementations, FIG. 2B illustrates the LSTM block 220 and the speech probability block 225 as two separate components within the second utterance detection component 220b. However, the disclosure is not limited thereto, and in some examples the speech probability block 225 may be included within the LSTM block 220. For example, the LSTM block 220 may be a neural network-based classifier and may include a final layer (e.g., softmax function, sigmoid function, etc.) that generates the probability values without departing from the disclosure.

While FIG. 2B illustrates the LSTM block 220 outputting the second data to the speech probability block 225 and the convolution block 230, the disclosure is not limited thereto. In some examples, the LSTM block 220 may output the second data only to the speech probability block 225 and the speech probability block 225 may output the second data (e.g., temporal features) and the probability values to the convolution block 230 without departing from the disclosure. Thus, the convolution block 230 may receive the second data from the speech probability block 225, and may generate the third data using the temporal features and/or the probability values. Additionally or alternatively, the speech probability block 225 may only output the probability values to the convolution block 230 and the convolution block 230 may generate the third data using the probability values without departing from the disclosure.

The convolution block 230 may apply one or more convolution filters to the second data to generate the third data. Typically, convolution filters are configured to identify continuities, such as repeated patterns within data. For example, first convolution filters used in object detection may look for similarities in image data using spatial embedding, such as similarities in texture and color. Based on these similarities, the first convolution filters may group areas together and form a bounding box around portions of the image data representing an object. Similarly, second convolution filters used in utterance detection may look for similarities in audio features using temporal embedding (e.g., temporal features), such as similarities in pitch, continuity in speech, and/or the like. Based on these similarities, the second convolution filters may group audio features together and form a boundary around portions of the audio data representing an utterance.

In some examples, the convolution block 230 may apply a series of F convolution filters to the second data to generate the third data. As described above, the second data may have second dimensions (e.g., N×D), indicating that the second data includes N rows of D columns. The third data may also include N rows (e.g., one value for each frequency range or frequency bin), but may have third dimensions (e.g., N×F), indicating that the third data includes N rows of F columns. For example, the third data may include a separate column for each of the F convolution filters, such that the third dimensions depend on the number of convolution filters, with each filter performing different operation(s) and/or extracting different information from the second data.

While the LSTM block 220 used to generate the second data calculates features within an individual frame of audio (e.g., audio frame), the convolution filters used in the convolution block 230 work across multiple audio frames. For example, while the features represented in the second data may be influenced by a neighboring audio frame, each feature is individually computed for a single audio frame. In contrast, the convolution filters generate spatial features that span across a variable number of audio frames. For example, individual convolution filters may correspond to different lengths (e.g., different number of audio frames), such that a first convolution filter may have a first length (e.g., first feature calculated using a first number of audio frames) while a second convolution filter may have a second length (e.g., second feature calculated using a second number of audio frames). Thus, the third data includes additional information about how the audio features are grouped together (e.g., where they start/end, heatmap information, and/or the like), although the disclosure is not limited thereto.

The convolution block 230 may output the third data to the utterance proposal block 240. For example, the convolution block 230 may output the third data to a sigmoid layer 242 configured to determine an utterance score and to a regression layer 244 configured to determine a boundary. As illustrated in FIG. 2B, the LSTM block 220 may optionally output the second data to the utterance proposal block 240. For example, the LSTM block 240 may output the second data to the sigmoid layer 242 and the regression layer 244 without departing from the disclosure. However, the disclosure is not limited thereto, and in some examples the convolution block 230 may output both the second data and the third data to the utterance proposal block 240 without departing from the disclosure. Thus, the utterance proposal block 240 may process the second data and/or the third data, although the disclosure is not limited thereto.

The utterance proposal block 240 may generate fourth data (e.g., provisional utterance data) corresponding to one or more utterances. For example, the regression layer 244 may identify a first boundary corresponding to a first utterance represented in the input audio data 205, and the sigmoid layer 242 may determine a first utterance score corresponding to the first boundary. In addition, the regression layer 244 may identify a second boundary corresponding to a second utterance represented in the input audio data 205, and the sigmoid layer 242 may determine a second utterance score corresponding to the second boundary. Thus, the utterance proposal block 240 may identify multiple utterances and/or generate multiple boundaries, some of which may overlap, without departing from the disclosure.

The utterance proposal block 240 may output the fourth data (e.g., provisional utterance data) to a post processing block 250 that is configured to generate utterance data 255. While the provisional utterance data may include multiple overlapping boundaries corresponding to a single utterance, the utterance data 255 may include a single boundary for each utterance. For example, the post processing block 250 may process the fourth data to determine a number of distinct utterances represented in the input audio data 205 and identify a single boundary and corresponding utterance score for each distinct utterance.

To illustrate examples of the post processing block 250 generating the utterance data 255, the fourth data may include a first utterance score corresponding to a first boundary and a second utterance score corresponding to a second boundary that overlaps the first boundary. In a first example, the post processing block 250 may determine that two utterances are represented in a portion of the input audio data 205 and may include both the first boundary and the second boundary in the utterance data 255. For example, the portion of the input audio data 205 may include a first representation of first speech generated by a first user 5a and a second representation of second speech generated by a second user 5b. Thus, while the two boundaries overlap, the post processing block 250 may determine that the first speech is distinct and separate from the second speech and may determine that the portion of the input audio data 205 corresponds to two utterances (e.g., detect two utterances). Additionally or alternatively, the portion of the input audio data 205 may only include a representation of the first speech generated by the first user 5a, but the first speech may include two separate thoughts or emotions. Thus, while the two boundaries may potentially overlap, the post processing block 250 may detect two distinct utterances represented in the portion of the input audio data 205. Thus, the utterance data 255 may indicate that a first portion of the first speech corresponds to a first utterance (e.g., first thought or emotion) and a second portion of the first speech corresponds to a second utterance (e.g., second thought or emotion).

In a second example, however, the post processing block 250 may determine that only a single utterance is represented in the portion of the input audio data 205 and may select between the first boundary and the second boundary to include in the utterance data 255. For example, the portion of the input audio data 205 may only include a representation of the first speech generated by the first user 5a and the first speech may correspond to a single connected thought or emotion. Thus, the post processing block 250 may determine that the portion of the input audio data 205 corresponds to a single utterance (e.g., detect a single utterance) and determine whether the first boundary or the second boundary is a better representation of the utterance. For example, the post processing block 250 may compare the first utterance score to the second utterance score and select a boundary corresponding to the highest utterance score.

Figure 3:
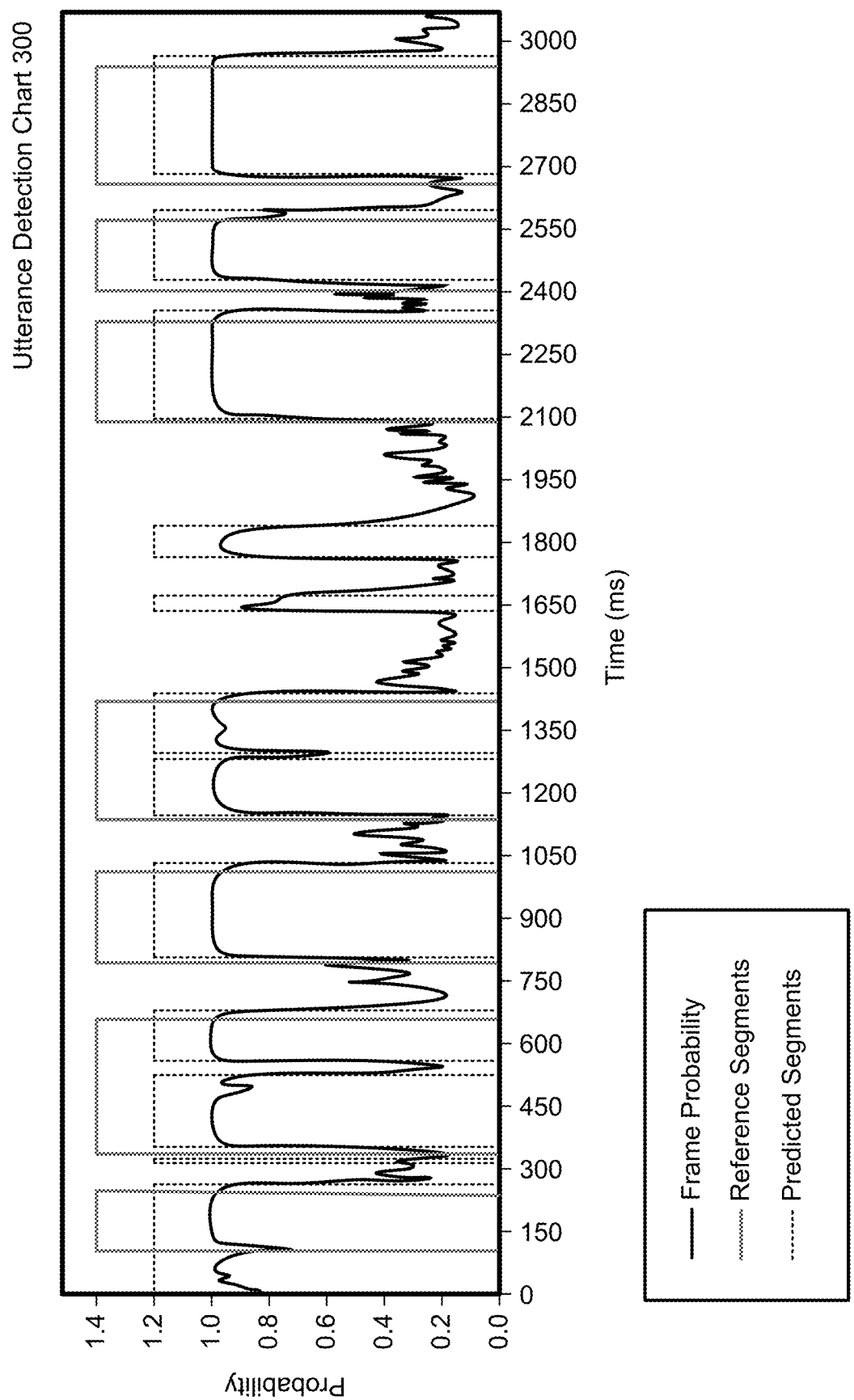
FIG. 3 illustrates an example utterance detection chart according to examples of the present disclosure.

FIG. 3 illustrates an example utterance detection chart according to examples of the present disclosure. As described in greater detail above with regard to FIGS. 2A-2B, the utterance detection component 200 may generate probability values and utterance data indicating boundaries associated with individual utterances detected in the input audio data 205. For example, the probability values may indicate a likelihood that speech is represented in an individual audio frame, while the utterance data may indicate an individual boundary identifying a beginning and ending associated with a corresponding utterance.

As shown in FIG. 3, utterance detection chart 300 illustrates examples of probability values and utterance data generated by the utterance detection component 200, along with corresponding training data (e.g., annotated start/end) that represents a ground truth for the utterance data. For example, the utterance detection chart 300 includes a thick dark line representing frame probability values (e.g., probability values generated by the utterance detection component 200), a thin gray line representing reference segments (e.g., boundaries corresponding to individual utterances) corresponding to the training data, and a dotted line representing predicted segments (e.g., boundaries corresponding to individual utterances) generated by the utterance detection component 200.

In the utterance detection chart 300 illustrated in FIG. 3, a horizontal axis (e.g., x-axis) represents time in milliseconds (ms), extending from 0 ms to 3000 ms, and a vertical axis (e.g., y-axis) represents a probability value, extending from a minimum value of 0.0 to a maximum value of 1.4. As described above with regard to FIGS. 2A-2B, the frame probability values correspond to a range of values between a first value (e.g., 0.0) and a second value (e.g., 1.0) and do not exceed the second value. However, to avoid overlap and distinguish between the frame probability values, the predicted segments and the reference segments, the utterance detection chart 300 associates the predicted segments with a third value (e.g., 1.2) and associates the reference segments with a fourth value (e.g., 1.4). Thus, the utterance detection chart 300 uses the third value and the fourth value to separate the predicted segments from both the reference segments and the frame probability values.

As illustrated in the utterance detection chart 300, the predicted segments generated by the utterance detection component 200 accurately track the frame probability values and have a strong correlation with the reference segments used as training data (e.g., human annotated utterance boundaries).

Figure 4A:
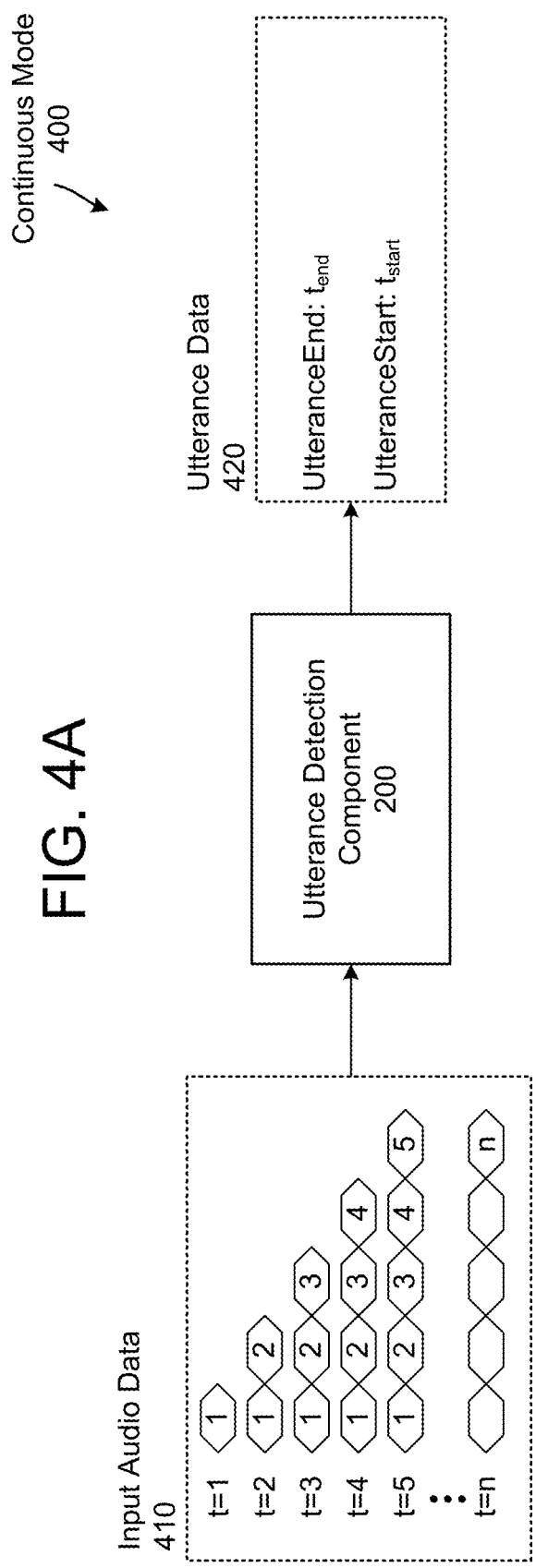
FIGS. 4A-4B illustrate examples of performing utterance detection using a continuous mode and a batch mode according to examples of the present disclosure.
Figure 4B:
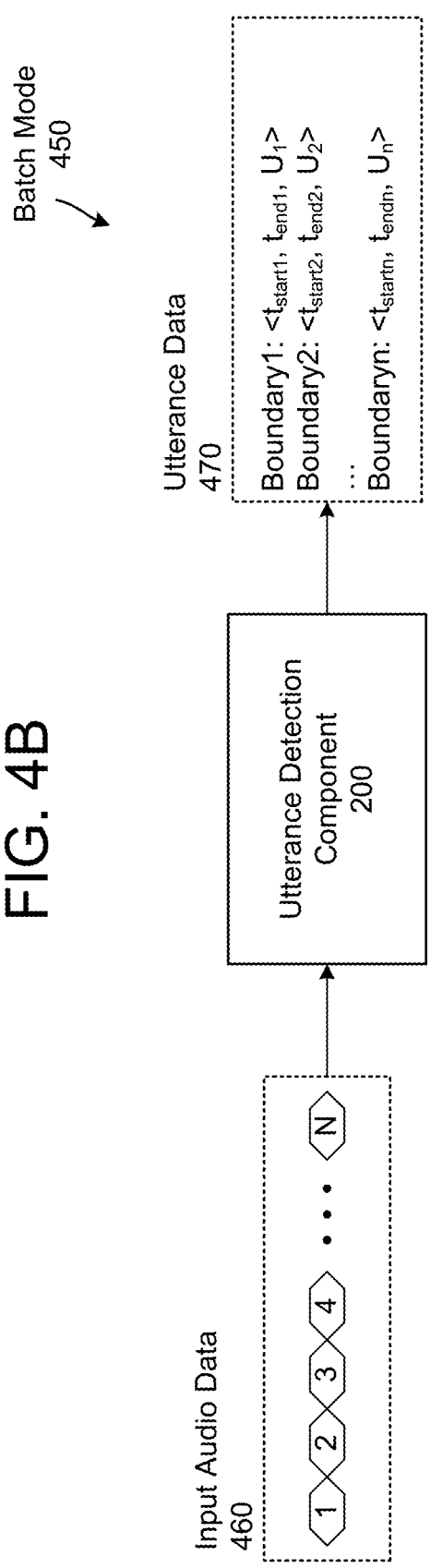

FIGS. 4A-4B illustrate examples of performing utterance detection using a continuous mode and a batch mode according to examples of the present disclosure. In some examples, the utterance detection component 200 may process a series of individual audio frames or small groups of audio frames over time (e.g., streaming processing). For example, the device 110 may process a single group of audio frames at a time, with each group of audio frames corresponding to a fixed period of time (e.g., k seconds) and the device 110 iteratively processing multiple groups. In some examples, the device 110 may split input audio data corresponding to an audio clip into multiple portions of audio data (e.g., multiple small groups of audio frames), and a length of the processed audio data may grow over time as the utterance detection component 200 processes more input audio data.

When the utterance detection component 200 is processing the input audio data during streaming processing, the utterance detection component 200 may optionally be configured to operate in a continuous mode 400, as illustrated in FIG. 4A. For example, when operating in the continuous mode 400, the utterance detection component 200 may generate sparse or abbreviated utterance data that indicates when an utterance ends or begins as it happens.

FIG. 4A illustrates a conceptual example of the utterance detection component 200 operating in continuous mode 400. As illustrated in FIG. 4A, the utterance detection component 200 may receive input audio data 410 as individual audio frames, with a first audio frame received at a first time (e.g., t=1), a second audio frame received at a second time (e.g., t=2), and so on until an n-th audio frame received at an n-th time (e.g., t=n). As the utterance detection component 200 is receiving the input audio data 410 in segments over time, the utterance detection component 200 may operate in the continuous mode 400 and process individual segments of the input audio data 410. For example, the utterance detection component 200 may generate utterance data 420 that only corresponds to a current segment of the input audio data 410.

As illustrated in FIG. 4A, the utterance data 420 may indicate an end of an utterance (e.g., UtteranceEnd: $t_{end}$) and/or a beginning of an utterance (e.g., UtteranceStart: $t_{start}$). For example, the utterance detection component 200 may identify an end of a first utterance at a first time (e.g., $t_1$) and may generate first utterance data 420a indicating that the first utterance ended (e.g., UtteranceEnd: $t_1$). Later, the utterance detection component 200 may identify a beginning of a second utterance at a second time (e.g., $t_2$) and may generate second utterance data 420b indicating that the second utterance started (e.g., UtteranceStart: $t_2$).

In some examples, there may be a period of time between the first time and the second time, during which the utterance detection component 200 does not detect an utterance. However, the disclosure is not limited thereto and in other examples the second time may occur immediately after the first time without departing from the disclosure. Thus, the utterance detection component 200 may detect when an utterance transition occurs and generate utterance data 420 indicating the utterance transition and/or whether an utterance is currently detected. While not illustrated in FIG. 4A, in some examples the utterance data 420 may include an utterance score, although the disclosure is not limited thereto. For example, the utterance data 420 may include a series of utterance scores indicating a likelihood that a current segment of audio data represents an utterance, an individual utterance score for each utterance transition, an individual utterance score corresponding to each pair of utterance transitions (e.g., beginning of an utterance and end of an utterance), and/or the like without departing from the disclosure.

In other examples, however, the utterance detection component 200 may process a group of audio frames (e.g., batch processing). When the utterance detection component 200 is processing a group of audio frames, the utterance detection component 200 may be configured to operate in a batch mode 450, as illustrated in FIG. 4B. For example, when operating in the batch mode 450, the utterance detection component 200 may generate full or detailed utterance data that indicates a boundary for an individual utterance (e.g., when the utterance begins and ends), along with an utterance score indicating a likelihood that the boundary corresponds to an utterance.

As illustrated in FIG. 4B, the utterance detection component 200 may receive input audio data 460 as a group of audio frames, with a plurality of audio frames (e.g., audio frame 1, audio frame 2, . . . audio frame N) received at a single time. For example, the device 110 may generate input audio data 460 corresponding to a variable period of time, ranging from several seconds to several minutes or even longer. In some examples, the input audio data 460 may correspond to a portion of a conversation, an entire conversation, multiple conversations, and/or the like. As the utterance detection component 200 is receiving the input audio data 460 as a group of audio frames at a single time, the utterance detection component 200 may operate in the batch mode 450 and process multiple segments of the input audio data 460 at a time. For example, the utterance detection component 200 may generate utterance data 470 that corresponds to multiple utterances without departing from the disclosure.

As illustrated in FIG. 4B, the utterance data 470 may indicate a boundary for an individual utterance (e.g., when the utterance begins and ends), along with an utterance score indicating a likelihood that the boundary corresponds to an utterance. Each individual boundary corresponds to a potential utterance represented in the input audio data 460. For example, FIG. 4B illustrates an example in which a first portion of the utterance data 470 is associated with a first boundary (e.g., Boundary1: $<t_{start1}, t_{end1}, U_1>$), a second portion of the utterance data 470 is associated with a second boundary (e.g., Boundary2: $<t_{start2}, t_{end2}, U_2>$), and so on until an n-th portion of the utterance data 470 is associated with an n-th boundary (e.g., Boundaryn: $<t_{startn}, t_{endn}, U_n>$).

As illustrated in FIG. 4B, the first portion of the utterance data 470 corresponds to a first boundary and indicates a first time (e.g., $t_{start1}$) corresponding to a beginning of a first utterance, a second time (e.g., $t_{end1}$) corresponding to an ending of the first utterance, and a first utterance score (e.g., $U_1$) indicating a first likelihood that a first portion of the input audio data 460 indicated by the first boundary represents an utterance. Similarly, the second portion of the utterance data 470 corresponds to a second boundary and indicates a third time (e.g., $t_{start2}$) corresponding to a beginning of a second utterance, a fourth time (e.g., $t_{end2}$) corresponding to an ending of the second utterance, and a second utterance score (e.g., $U_2$) indicating a second likelihood that a second portion of the input audio data 460 indicated by the second boundary represents an utterance.

In some examples, there may be a period of time between the second time (e.g., $t_{end1}$) and the third time (e.g., $t_{start2}$), during which the utterance detection component 200 does not detect an utterance. Thus, the first utterance may be temporally separated from the second utterance and the utterance detection component 200 may determine that speech is not detected in the input audio data 460 and/or that speech detected in the input audio data 460 does not correspond to an utterance during this period of time. However, the disclosure is not limited thereto and in other examples the third time may occur immediately after the second time without departing from the disclosure.

In some examples, the utterance detection component 200 may separate a single sentence or string of audio frames representing speech into two or more utterances. For example, the utterance detection component 200 may segment the input audio data 460 such that an individual segment corresponds to a complete phrase, thought process, emotion, train of thought, and/or the like. Thus, the utterance detection component 200 does not simply identify a continuous string of audio frames of detected speech and group these audio frames as a single utterance. Instead, the utterance detection component 200 may be configured to segment the continuous string of audio frames of detected speech into two or more separate utterances representing different thoughts or emotions. To illustrate an example, if the user 5 is speaking happily for a first period of time (e.g., ten seconds) and then becomes angry for a second period of time (e.g., six seconds), the utterance detection component 200 may identify a change in an emotional state of the user 5 and associate the first period of time with a first utterance and the second period of time with a second utterance.

As described above with regard to FIG. 4A, the utterance data 420 generated during the continuous mode 400 may indicate an utterance transition and/or whether an utterance is currently detected. In contrast, the utterance data 470 generated during the batch mode 450 may include additional information and may correspond to a longer period of time. For example, the utterance data 470 may include two utterance transitions (e.g., beginning and ending) for an individual utterance, along with an utterance score corresponding to the individual utterance. While FIG. 4B illustrates that the utterance data 470 may include multiple boundaries corresponding to multiple utterances, the disclosure is not limited thereto and the utterance data 470 may include a single boundary corresponding to a single utterance without departing from the disclosure.

Additionally or alternatively, while FIG. 4B illustrates the utterance detection component 200 generating the utterance data 470 while operating in the batch mode 450, the disclosure is not limited thereto. In some examples, the utterance detection component 200 may generate the utterance data 470 while operating in continuous mode 400 without departing from the disclosure. For example, the utterance detection component 200 may receive the input audio data 410 and may process individual audio frames or segments of audio frames over time (e.g., streaming processing) in order to generate the utterance data 470. Thus, the utterance detection component 200 may determine boundaries and utterance scores corresponding to one or more utterances represented in the input audio data 410 even when operating in the continuous mode 400 without departing from the disclosure.

Figure 5A:
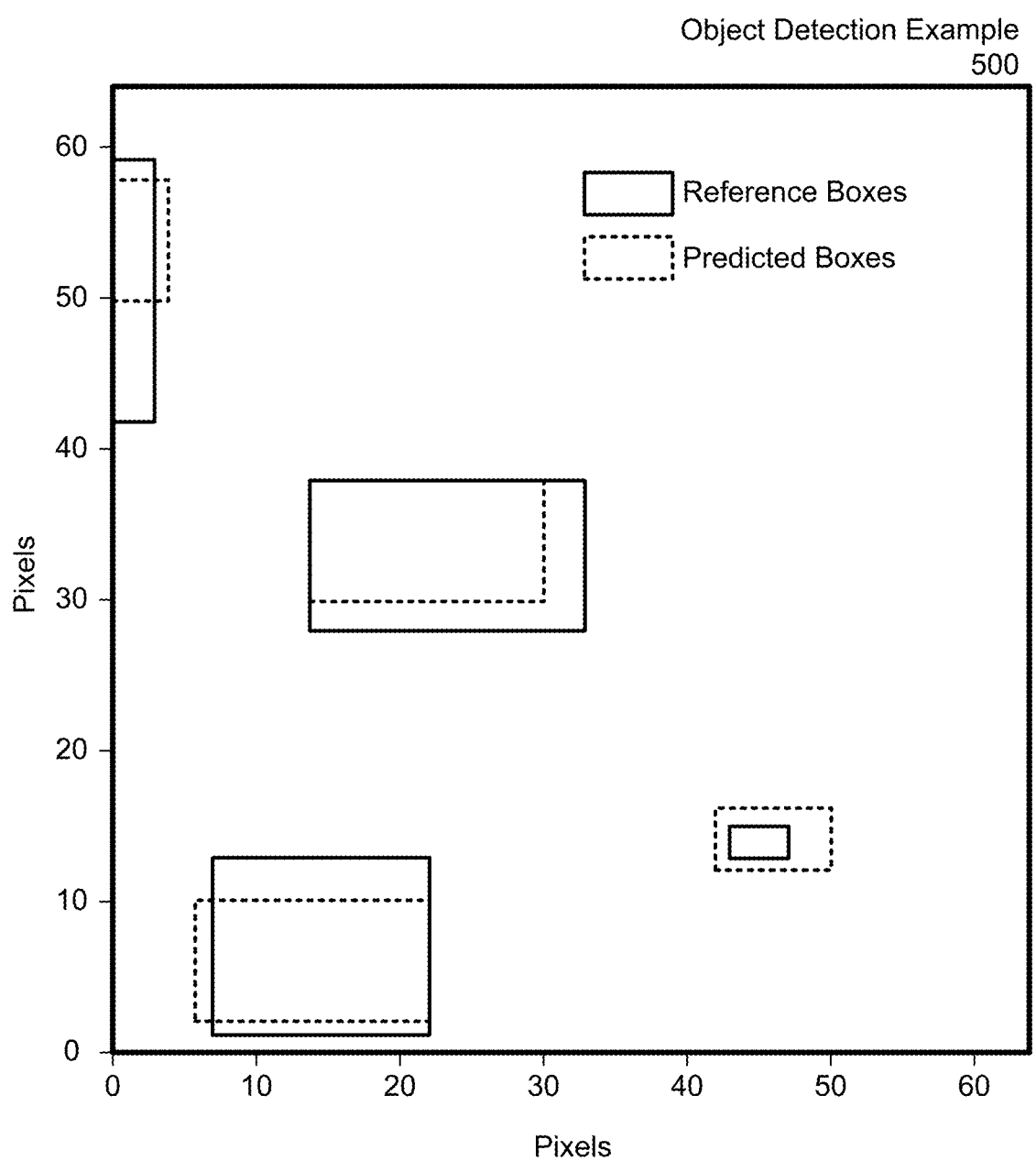
FIGS. 5A-5B illustrate an example of object detection results and an example of extending object detection to perform utterance detection according to examples of the present disclosure.
Figure 5B:
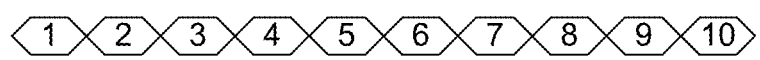
Figure 5B:
Figure 5B:
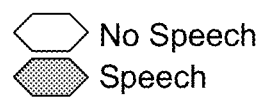
Figure 5B:
Figure 5B:
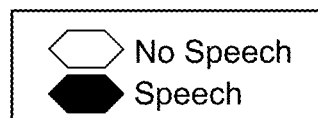
Figure 5B:
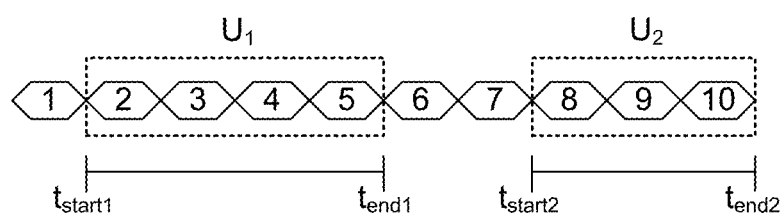

FIGS. 5A-5B illustrate an example of object detection results and an example of extending object detection to perform utterance detection according to examples of the present disclosure. Typically, object detection is performed on image data to identify bounding boxes associated with objects represented in the image data (e.g., objects within an image). For example, FIG. 5A illustrates an example of an object detection example 500 in which object detection techniques are performed on input image data to generate bounding boxes. As illustrated in FIG. 5A, a horizontal axis (e.g., x-axis) of the object detection example 500 indicates pixels of the input image data along a first dimension (e.g., columns), while a vertical axis (e.g., y-axis) of the object detection example 500 indicates pixels of the input image data along a second dimension (e.g., rows). In the example illustrated in FIG. 5A, reference bounding boxes (e.g., reference boxes) indicating actual areas in which objects are represented in the input image data are illustrated using a thick black line, while predicted bounding boxes (e.g., predicted boxes) indicating the bounding boxes generated using object detection are illustrated using a dotted line.

To improve utterance detection, the device 110 may be configured to adapt object detection techniques in order to perform utterance detection using audio data. For example, the device 110 may consider utterances within an audio clip as analogous to multiple objects represented in the image data. Using the object detection techniques, the device 110 may learn to separate speech segments corresponding to individual utterances represented in audio data. For example, the utterance detection component 200 may transfer the spatial domain techniques used in object detection frameworks to the temporal domain associated with audio data in order to learn the boundaries of utterances.

FIG. 5B illustrates an example of data generated by the utterance detection component 200 while performing utterance detection 520. As illustrated in FIG. 5B, the utterance detection component 200 may receive input audio data and may generate input audio feature data 530, which is represented as a series of ten segments (e.g., segments 1-10). For ease of illustration, the following description will refer to the input audio feature data 530 as including multiple segments, with each segment corresponding to a group of audio frames associated with a fixed period of time (e.g., 10 ms, although the disclosure is not limited thereto). However, the disclosure is not limited thereto, and the utterance detection component 200 may process a series of audio frames without departing from the disclosure. As described above with regard to FIGS. 2A-2B, the utterance detection component 200 may generate input audio feature data 530 (e.g., first data) using feature extraction block 210, and the input audio feature data 530 may represent audio features associated with the input audio data, such as log filterbank energy (LFBE) audio features, mel-frequency cepstral coefficient (MFCC) audio features, and/or the like.

The feature extraction block 210 may output the input audio feature data 530 to the LSTM block 220, which may extract temporal information (e.g., generate temporal embedding, temporal features, etc.) and generate temporal feature data 540, which may optionally indicate whether speech is represented in each segment of the input audio feature data 530. As illustrated in FIG. 5B, the temporal feature data 540 is represented as a series of ten segments (e.g., segments 1-10), with a first color (e.g., white) indicating that speech is not detected and a second color (e.g., gray) indicating that speech is detected. For example, FIG. 5B illustrates that speech is detected in segments 2-5 and 8-10, although this is intended to conceptually illustrate an example and the disclosure is not limited thereto. However, the disclosure is not limited thereto, and in some examples the temporal feature data 540 may not indicate whether speech is represented in individual segments of the input audio feature data 530 without departing from the disclosure.

The LSTM block 220 may output the temporal feature data 540 to the convolution block 230, which may determine spatial features and generate spatial data 550 representing the spatial features. As illustrated in FIG. 5B, the spatial data 550 is represented as a series of ten segments (e.g., segments 1-10), with a first color (e.g., white) indicating segments in which speech is not detected and a third color (e.g., black) indicating segments in which speech is detected. The spatial data 550 is represented using the third color in order to illustrate that the spatial data 550 is embedded with the spatial features on which the utterance proposal block 240 will act.

Effectively, the convolution block 230 treats the time axis as a spatial axis and applies object detection techniques to identify where to separate the speech segments into different utterances. For example, the convolution block 230 may treat segments of the temporal feature data 540 (or audio frames within the temporal feature data 540) that represent temporal features similar to pixels in an image, applying one or more convolution operations to generate the spatial data 550. However, while object detection techniques process image data in two dimensions (e.g., detecting objects represented in both a horizontal direction and a vertical direction), the utterance detection component 200 only processes the temporal feature data 540 using a single dimension (e.g., time axis).

The convolution block 230 may output the spatial data 550 to the utterance proposal block 240, which may determine one or more boundaries and corresponding utterance scores and generate utterance data 560. As illustrated in FIG. 5B, the utterance data 560 identifies two boundaries, which are represented as rectangles having dotted lines that enclose segments associated with an individual utterance. For example, a first utterance is indicated by a first boundary extending from a first time (e.g., $t_{start1}$) to a second time (e.g., $t_{end1}$), which includes first segments (e.g., segments 2-5), and a first utterance score (e.g., $U_1$) indicating a first likelihood that the first segments represent an utterance. Similarly, a second utterance is represented by a second boundary extending from a third time (e.g., $t_{start2}$) to a fourth time (e.g., $t_{end2}$), which includes second segments (e.g., segments 8-10), and a second utterance score (e.g., $U_2$) indicating a second likelihood that the second segments represent an utterance.

While FIG. 5B illustrates an example in which the temporal feature data 540 may indicate that a segment of audio data represents speech, the disclosure is not limited thereto. For example, the temporal feature data 540 may not include speech frame data (e.g., may not indicate whether speech is represented) without departing from the disclosure. Instead, the device 110 may process the temporal feature data and detect utterance(s) without explicitly determining whether speech is represented in individual segments of the audio data.

Figure 6A:
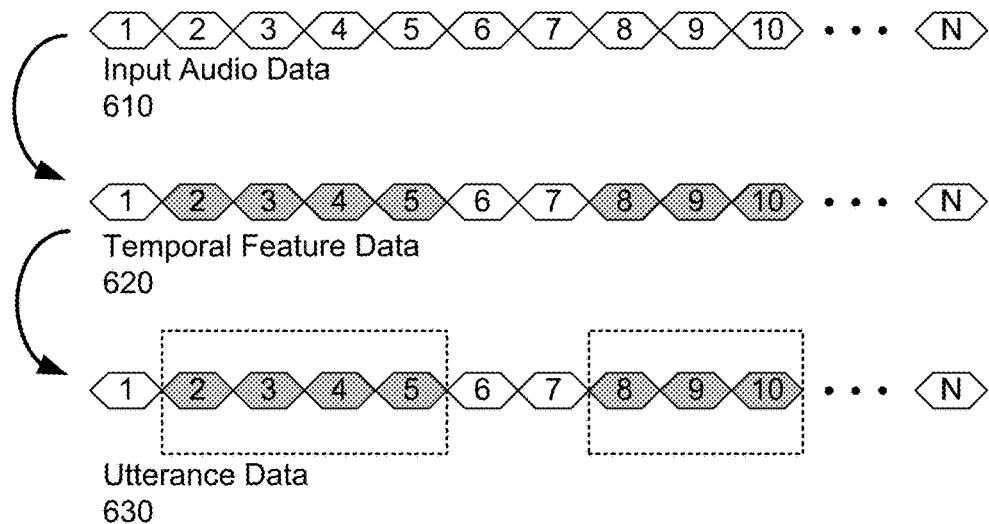
FIGS. 6A-6B illustrate examples of batch utterance detection and continuous utterance detection according to examples of the present disclosure.
Figure 6B:
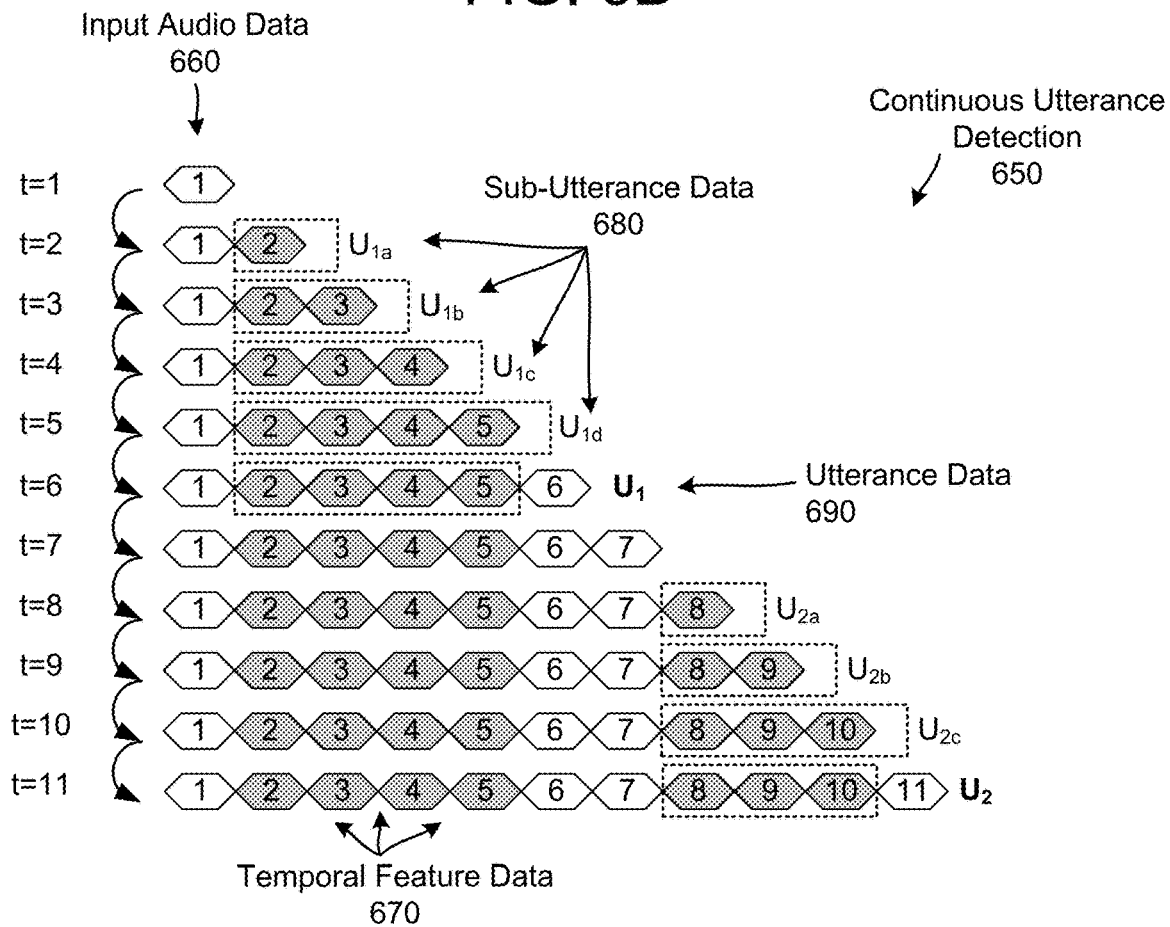

FIGS. 6A-6B illustrate examples of batch utterance detection and continuous utterance detection according to examples of the present disclosure. As described above, in some examples the device 110 may operate in a batch mode while in other examples the device 110 may operate in a continuous mode. When the device 110 is operating in batch mode, the utterance detection component 200 may perform batch utterance detection 600, which is illustrated in FIG. 6A. For example, the utterance detection component 200 may receive input audio data 610 comprising a plurality of segments (e.g., segments 1-N), may generate temporal feature data 620 for the plurality of segments, and may generate utterance data 630 for the plurality of segments, as described above with regard to FIG. 5B.

When the device 110 is operating in continuous mode, however, in some examples the utterance detection component 200 may perform continuous utterance detection 650, which is illustrated in FIG. 6B. For example, the utterance detection component 200 may receive input audio data 660 as individual segments over time, such as a first segment (e.g., segment 1) at a first time (e.g., t=1), a second segment (e.g., segment 2) at a second time (e.g., t=2), and so on until an eleventh segment (e.g., segment 11) at an eleventh time (e.g., t=11).

As the utterance detection component 200 receives individual segments of the input audio data 660, the utterance detection component 200 may determine temporal feature data 670. For example, the utterance detection component 200 may determine that speech is represented in individual segments of the input audio data 660. FIG. 6B illustrates non-speech segments of the input audio data 660 using a first color (e.g., white) and illustrates speech segments of the input audio data 660 using a second color (e.g., gray).

As the segments of the input audio data 660 are processed to generate the temporal feature data 670, the utterance detection component 200 may determine sub-utterance data 680. For example, instead of waiting to process all of the input audio data 660 to generate utterance data 690, the utterance detection component 200 may process segments of the input audio data 660 and generate multiple iterations of the sub-utterance data 680. Thus, the utterance detection component 200 may update the sub-utterance data over time, as each segment of the input audio data 660 is processed, before identifying an end of the utterance and generating utterance data 690.

As illustrated in FIG. 6B, the utterance detection component 200 may receive a first segment (e.g., segment 1) of the input audio data 660 at a first time (e.g., t=1) and may generate a first portion of the temporal feature data 670 that may indicate that the first segment does not represent speech. The utterance detection component 200 may then receive a second segment (e.g., segment 2) of the input audio data 660 at a second time (e.g., t=2) and may generate a second portion of the temporal feature data 670 that may indicate that the second segment represents speech. At this point, the utterance detection component 200 may determine first sub-utterance data 680, which may include a first provisional boundary (e.g., sub-utterance boundary) beginning with the second segment, along with a first sub-utterance score $U_{1a}$ indicating a first likelihood that the first provisional boundary represents an utterance.

The utterance detection component 200 may then receive a third segment (e.g., segment 3) of the input audio data 660 at a third time (e.g., t=3) and may generate a third portion of the temporal feature data 670 that may indicate that the third segment represents speech. At this point, the utterance detection component 200 may determine second sub-utterance data 680, which may include a second provisional boundary beginning with the second segment, along with a second sub-utterance score $U_{1b}$ indicating a second likelihood that the second provisional boundary represents an utterance. Thus, the utterance detection component 200 may update the sub-utterance data 680 with an adjusted sub-utterance score and an updated provisional boundary based on the third segment of the input audio data 660. The utterance detection component 200 may continue this process to generate third sub-utterance data 680 (e.g., with a third sub-utterance score $U_{1c}$) in response to a fourth segment (e.g., segment 4) of the input audio data 660 at a fourth time (e.g., t=4) and generate fourth sub-utterance data 680 (e.g., with a fourth sub-utterance score $U_{1d}$) in response to a fifth segment (e.g., segment 5) of the input audio data 660 at a fifth time (e.g., t=5).

At a sixth time (e.g., t=6), the utterance detection component 200 may receive a sixth segment (e.g., segment 6) of the input audio data 660 and may generate a sixth portion of the temporal feature data 670 that may indicate that the sixth segment does not represent speech. At this point, the utterance detection component 200 may identify an ending of a first utterance and generate utterance data 690, which may include a first boundary beginning with the second segment and ending with the fifth segment, along with a first utterance score $U_1$ indicating an overall likelihood that the first boundary represents an utterance.

As illustrated in FIG. 6B, the utterance detection component 200 may receive additional input audio data 660 (e.g., segments 7-10) and perform similar steps to generate sub-utterance data corresponding to a second utterance. For example, FIG. 6B illustrates an example of sub-utterance scores (e.g., $U_{2a}$-$U_{2c}$) and corresponding provisional boundaries associated with the second utterance. Finally, At an eleventh time (e.g., t=11), the utterance detection component 200 may receive an eleventh segment (e.g., segment 11) of the input audio data 660 and may generate an eleventh portion of the temporal feature data 670 that may indicate that the eleventh segment does not represent speech. At this point, the utterance detection component 200 may identify an ending of a second utterance and generate utterance data 690, which may include a second boundary beginning with the eighth segment and ending with the tenth segment, along with a second utterance score $U_2$ indicating an overall likelihood that the second boundary represents an utterance.

While FIGS. 6A-6B illustrate examples in which the temporal feature data 620/670 may indicate that a segment of audio data represents speech, the disclosure is not limited thereto. For example, the temporal feature data 620/670 may not include speech frame data (e.g., may not indicate whether speech is represented) without departing from the disclosure. Instead, the device 110 may process the temporal feature data and detect utterance(s) without explicitly determining whether speech is represented in individual segments of the audio data.

Figure 7:
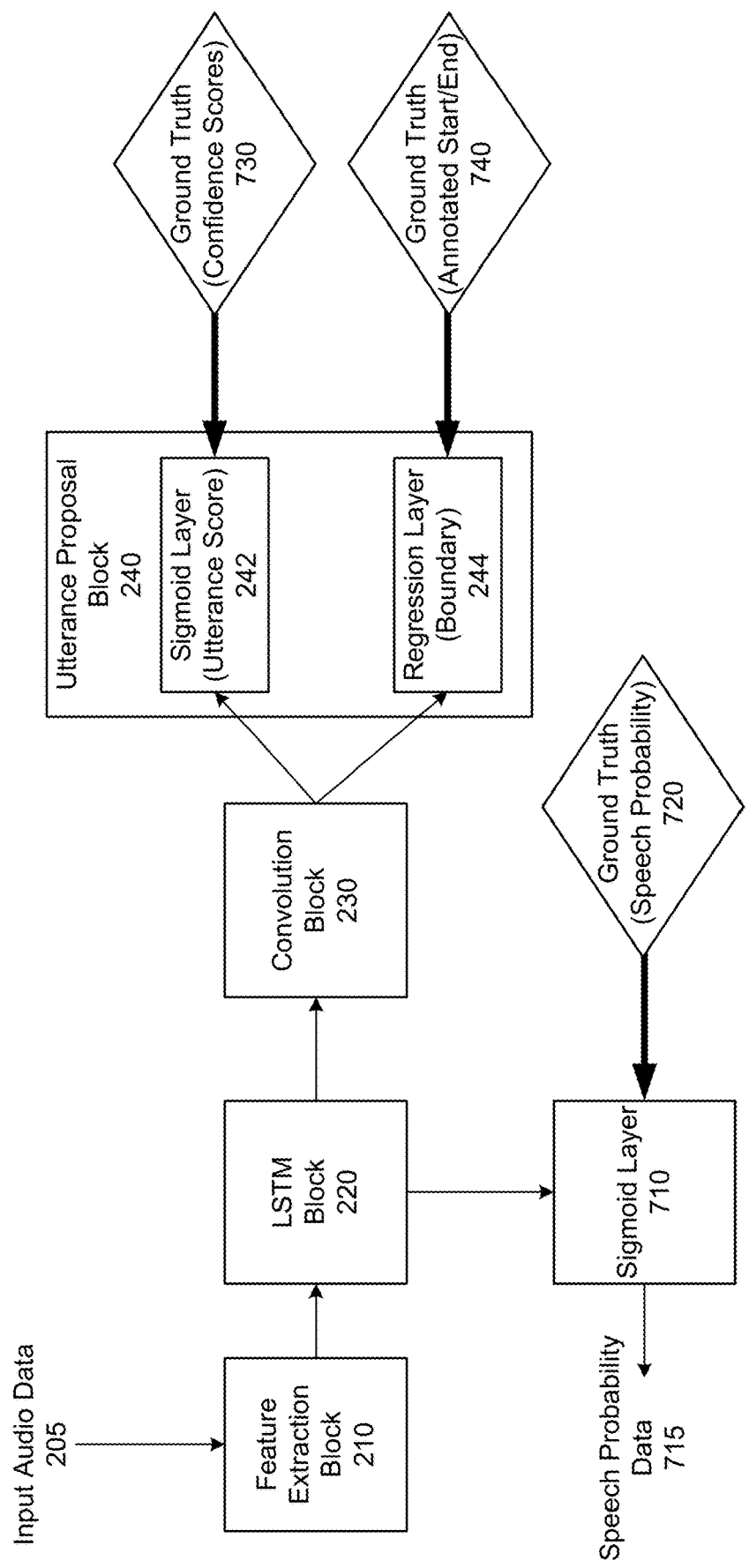
FIG. 7 illustrates an example of utterance detection training according to examples of the present disclosure.

FIG. 7 illustrates an example of utterance detection training according to examples of the present disclosure. As many components illustrated in FIG. 7 were previously described above with regard to FIGS. 2A-2B, a redundant description is omitted. As illustrated in FIG. 7, the utterance detection component 200 may perform utterance detection training 700 to configure trained models (e.g., neural network(s), machine learning model(s), etc.) included in the utterance detection component 200 to perform utterance detection. The utterance detection training 700 illustrated in FIG. 7 includes three kinds of ground truths (e.g., training data) that may be used to train the utterance detection component 200.

A first ground truth, which is used to train the LSTM block 220, is illustrated in FIG. 7 as ground truth (speech probability) 720. In the example illustrated in FIG. 7, the utterance detection component 200 includes a sigmoid layer 710 that is configured to receive the second data generated by the LSTM block 220 and to generate speech probability data 715 (e.g., framewise speech probability values). In some examples, the sigmoid layer 710 may correspond to the speech probability block 225 described above with regard to FIG. 2B. However, the disclosure is not limited thereto, and in other examples the sigmoid layer 710 may be used to train the first utterance detection component 200a illustrated in FIG. 2A without departing from the disclosure.

To generate the speech probability data 715, the sigmoid layer 710 may be configured to generate a probability value (e.g., value between 0 and 1) indicating a likelihood that a particular audio frame represents speech. Thus, the sigmoid layer 710 may convert the temporal features represented in the second data to probability values represented in the speech probability data 715.

While FIG. 7 illustrates the convolution block 230 processing the second data generated by the LSTM block 220, as described above with regard to FIG. 2A, the disclosure is not limited thereto and in some examples the convolution block 230 may process the speech probability data 715 generated by the sigmoid layer 710 without departing from the disclosure. Thus, the convolution block 230 may process the probability values represented in the speech probability data 715 and/or the temporal features (e.g., temporal embeddings) represented in the second data without departing from the disclosure.

While FIG. 7 illustrates the sigmoid layer 710 as being separate from the LSTM block 220, the disclosure is not limited thereto. In some examples, the sigmoid layer 710 may be included within the LSTM block 220 without departing from the disclosure. For example, the LSTM block 220 may be a neural network-based classifier and may include a final layer (e.g., softmax function, sigmoid function, etc.) that generates the probability values without departing from the disclosure.

The utterance detection component 200 may train the LSTM block 220 by comparing the speech probability data 715 generated by the sigmoid layer 710 with the ground truth (speech probability) 720 used as first training data. For example, the ground truth (speech probability) 720 may indicate whether speech is actually represented in an audio frame, enabling the utterance detection component 200 to compare the predicted speech probability value to the actual value represented in the ground truth (speech probability) 720.

A second ground truth, which is used to train the sigmoid layer (utterance score) 242 included in the utterance proposal block, is illustrated in FIG. 7 as ground truth (confidence scores) 730. For example, the ground truth (confidence scores) 730 may indicate whether an utterance is actually represented in audio data corresponding to a boundary, enabling the utterance detection component 200 to compare a predicted utterance score for the boundary to the actual value represented in the ground truth (confidence scores) 730.

A third ground truth, which is used to train the regression layer (boundary) 244 included in the utterance proposal block, is illustrated in FIG. 7 as ground truth (annotated start/end) 740. For example, the ground truth (annotated start/end) 740 may indicate an actual boundary (e.g., beginning and ending) for an utterance represented in the input audio data 205, enabling the utterance detection component 200 to compare a predicted boundary to the actual boundary represented in the ground truth (annotated start/end) 740.

The utterance detection component 200 may train the pipeline using at least two different implementations. In a first implementation, the utterance detection component 200 may perform end to end training for the entire utterance detection component 200, including the LSTM block 220, the convolution block 230, and the utterance proposal block 240. For example, the utterance detection component 200 may use the three types of ground truth (e.g., training data) to train all of the trained models included in the utterance detection component 200 simultaneously.

In a second implementation, the utterance detection component 200 may train the LSTM block 220 individually, keeping the convolution block 230 and the utterance proposal block 240 frozen, thereby learning only temporal features to start. After training the LSTM block 220 using the ground truth (speech probability) 720, the utterance detection component 200 may perform end to end training for the entire utterance detection component 200, including the LSTM block 220, the convolution block 230, and the utterance proposal block 240. For example, the utterance detection component 200 may use the three types of ground truth (e.g., training data) to train all of the trained models included in the utterance detection component 200 simultaneously.

As described above, the utterance detection component 200 may include one or more trained models. For example, the LSTM block 220 may correspond to a first trained model, the convolution block 230 may correspond to a second trained model, and the utterance proposal block may correspond to a third trained model. In some examples, the speech probability block 225 and/or the sigmoid layer 710 may correspond to a fourth trained model, although the disclosure is not limited thereto and the speech probability block 225 and/or the sigmoid layer 710 may be included with the LSTM block 220 as part of the first trained model without departing from the disclosure. Additionally or alternatively, the utterance detection component 200 itself may also be considered a trained model. For example, the utterance detection component 200 may correspond to a trained model comprising a plurality of layers included in the feature extraction block 210, the LSTM block 220, the speech probability block 225 (e.g., the sigmoid layer 710), the convolution block 230, the utterance proposal block 240, the post processing block 250, and/or the like.

During training, the device 110 may train (e.g., optimize) each of the trained models independently and/or optimize a combination of two or more trained models simultaneously. For example, when optimizing an individual trained model independently from the other blocks, the device 110 may freeze layers (e.g., freeze weights associated with one or more layers) included in the other blocks while dynamically updating layers and/or weights associated with the layers in the trained model being optimized. Similarly, if the device 110 optimizes two trained models simultaneously, the device 110 may freeze layers (e.g., freeze weights associated with one or more layers) included in the remaining blocks while dynamically updating layers and/or weights associated with the layers in the two trained model being optimized. Finally, if the device 110 optimizes all of the trained models simultaneously, the device 110 may dynamically update layers and/or weights associated with the layers for all of the trained models.

Figure 8:
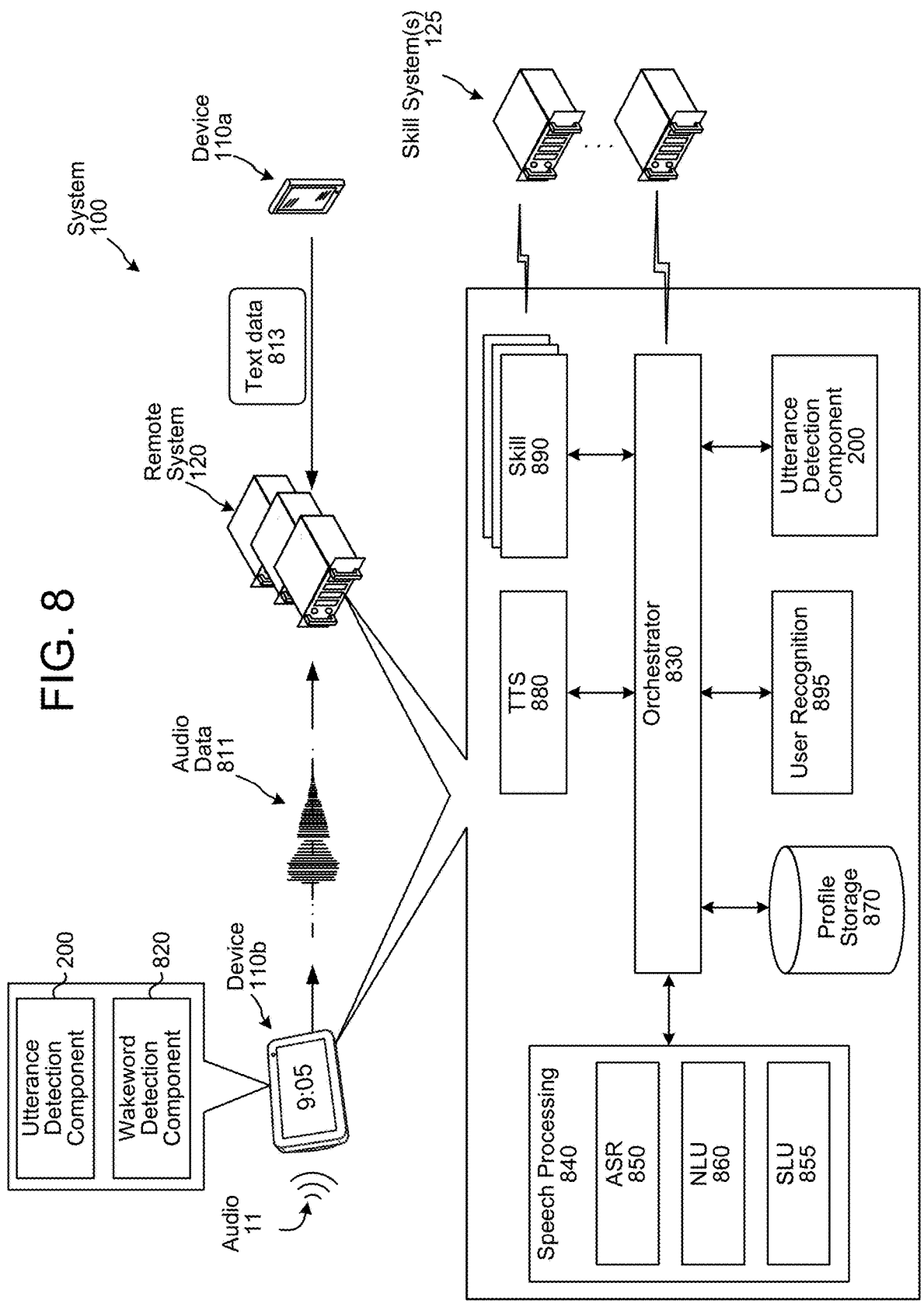
FIG. 8 is a conceptual diagram of components of the system performing natural language processing.

The system 100 may operate using various components as described in FIG. 8. The various components may be located on a same or different physical devices. Communication between various components may occur directly or across a network(s) 199.

An audio capture component(s), such as a microphone or array of microphones of the device 110*b*, captures audio 11. The device 110*b* processes audio data, representing the audio 11, to determine whether speech is detected. The device 110*b* may use various techniques to determine whether audio data includes speech. In some examples, the device 110*b* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*b* may implement a limited classifier configured to distinguish speech from background noise. The classifier may be implemented by techniques such as linear classifiers, support vector machines, and decision trees. In still other examples, the device 110*b* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*b* may use a wakeword detection component 820 to perform wakeword detection to determine when a user intends to speak an input to the remote system 120. As indicated previously, the device 110*b* may be configured to detect various wakewords, with each wakeword corresponding to a different assistant. In at least some examples, a wakeword may correspond to a name of an assistant. An example wakeword/assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 820 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 820 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110*b* may "wake" and begin transmitting audio data 811, representing the audio 11, to the remote system 120. The audio data 811 may include data corresponding to the detected wakeword, or the device 110*b* may remove the portion of the audio corresponding to the detected wakeword prior to sending the audio data 811 to the remote system 120.

The remote system 120 may include an orchestrator component 830 configured to receive the audio data 811 (and optionally and assistant identifier) from the device 110*b*. The orchestrator component 830 may send the audio data 811 to a speech processing component 840. In some examples, the speech processing component 840 may include an ASR component 850 and an NLU component 860 that are configured to process the audio data 811 to generate NLU data. However, the disclosure is not limited thereto and in other examples, the speech processing component 840 may include a spoken language understanding (SLU) component 855 that is configured to process the audio data 811 to generate the NLU data. Additionally or alternatively, the speech processing component 840 may include the ASR component 850, the NLU component 860 and/or the SLU component 855 without departing from the disclosure.

The ASR component 850 transcribes the audio data 811 into ASR results data (e.g., text data) include one or more ASR hypotheses (e.g., in the form of an N-best list). Each ASR hypothesis may represent a different likely interpretation of the speech in the audio data 811. Each ASR hypothesis may be associated with a score representing a confidence of ASR processing performed to generate the ASR hypothesis with which the score is associated.

The ASR component 850 interprets the speech in the audio data 811 based on a similarity between the audio data 811 and pre-established language models. For example, the ASR component 850 may compare the audio data 811 with models for sounds (e.g., subword units, such as phonemes, etc.) and sequences of sounds to identify words that match the sequence of sounds of the speech represented in the audio data 811.

In some examples, the device 110*a* may receive a typed natural language input. The device 110*a* may generate text data 813 representing the typed natural language input. The device 110*a* may send the text data 813 to the remote system 120, wherein the text data 813 is received by the orchestrator component 830. However, the disclosure is not limited thereto and in other examples, the device 110*a* may send audio data 811 to the remote system 120 as described above with regard to device 110*b* without departing from the disclosure.

The orchestrator component 830 may send text data (e.g., text data output by the ASR component 850 or the received text data 813) to an NLU component 860.

The orchestrator component 830 (or other component) may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering skill and may prompt the user several times for several utterances to obtain the data from the user needed to complete the pizza order (e.g., toppings, time of delivery, any additional items to order, etc.). Another example may be the user invoking a quiz game skill, where multiple questions are asked of the user and the user responds with utterances that are processed by the system and whose text data is sent to the quiz show skill. Each utterance of the dialog may have a unique utterance ID but may also share a common dialog ID so that the system can process incoming audio data knowing that it is associated with a particular dialog.

The remote system 120 may store dialog data indicating the dialog ID and a variety of other information, including input audio data representing an utterance, output audio data representing synthesized speech, first text data corresponding to the utterance, second text data corresponding to the synthesized speech, and/or other information without departing from the disclosure. As used herein, an exchange refers to at least one input and at least one output responsive to the input. Thus, a single exchange may include one or more inputs and one or more outputs, and the dialog may correspond to two or more exchanges without departing from the disclosure. For ease of illustration, an exchange may be referred to as an interaction without departing from the disclosure.

The NLU component 860 attempts to make a semantic interpretation of the phrase(s) or statement(s) represented in the received text data. That is, the NLU component 860 determines one or more meanings associated with the phrase(s) or statement(s) represented in the text data based on words represented in the text data. The NLU component 860 determines an intent representing an action that a user desires be performed as well as pieces of the text data that allow a device (e.g., the device (110*a*/110*b*), the remote system 120, a skill system 125, etc.) to execute the intent. For example, if the text data corresponds to "play Adele music," the NLU component 860 may determine a <PlayMusic> intent and may identify "Adele" as an artist. For further example, if the text data corresponds to "what is the weather," the NLU component 860 may determine an <OutputWeather> intent. In another example, if the text data corresponds to "turn off the lights," the NLU component 860 may determine a <DeactivateLight> intent.

The NLU component 860 may output NLU results data (which may include tagged text data, indicators of intent, etc.) to the orchestrator component 830. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 860 in the processing performed to generate the NLU hypothesis associated with the confidence value.

As described above, the remote system 120 may perform speech processing using two different components (e.g., the ASR component 850 and the NLU component 860). One skilled in the art will appreciate that the remote system 120, in at least some examples, may implement a spoken language understanding (SLU) component 855 that is configured to process audio data 811 to generate NLU results data without departing from the disclosure.

In some examples, the SLU component 855 may be equivalent to the ASR component 850 and the NLU component 860. While the SLU component 855 may be equivalent to a combination of the ASR component 850 and the NLU component 860, the SLU component 855 may process audio data 811 and directly generate the NLU results data, without an intermediate step of generating text data (as does the ASR component 850). As such, the SLU component 855 may take audio data 811 representing speech and attempt to make a semantic interpretation of the speech. That is, the SLU component 855 may determine a meaning associated with the speech and then implement that meaning. For example, the SLU component 855 may interpret audio data 811 representing speech from the user 5 in order to derive a desired action. In some examples, the SLU component 855 outputs a most likely NLU hypothesis, or multiple NLU hypotheses in the form of a lattice or an N-best list with individual NLU hypotheses corresponding to confidence scores or other scores (such as probability scores, etc.).

The orchestrator component 830 may send the NLU results to an associated skill component 890. If the NLU results include multiple NLU hypotheses, the orchestrator component 830 may send a portion of the NLU results corresponding to the top scoring NLU hypothesis to a skill component 890 associated with the top scoring NLU hypothesis.

A "skill" or "skill component" may be software running on the remote system 120 that is akin to a software application running on a traditional computing device. That is, a skill component 890 may enable the remote system 120 to execute specific functionality in order to perform one or more actions (e.g., provide information to a user, display content to a user, output music, or perform some other requested action). The remote system 120 may be configured with more than one skill component 890. For example, a weather skill component may enable the remote system 120 to provide weather information, a ride sharing skill component may enable the remote system 120 to schedule a trip with respect to a ride sharing service, a restaurant skill component may enable the remote system 120 to order food with respect to a restaurant's online ordering system, a communications skill component may enable the system to perform messaging or multi-endpoint communications, etc. A skill component 890 may operate in conjunction between the remote system 120 and other devices such as the device 110 or skill system(s) 125 in order to complete certain functions. Inputs to a skill component 890 may come from various interactions and input sources.

The functionality described herein as a skill or skill component may be referred to using many different terms, such as an action, bot, app, application, speechlet or the like. A skill component 890 may include hardware, software, firmware, or the like that may be dedicated to the particular skill component 890 or shared among different skill components 890. A skill component 890 may be part of the remote system 120 (as illustrated in FIG. 8) or may be located at whole (or in part) with one or more separate systems. Unless expressly stated otherwise, reference to a skill, skill device, or skill component may include a skill component operating within the remote system 120 (for example as skill component 890) and/or skill component operating within a system separate from the remote system 120.

A skill component 890 may be configured to perform one or more actions. A skill may enable a skill component 890 to execute specific functionality in order to provide data or produce some other output requested by a user. A particular skill component 890 may be configured to execute more than one skill. For example, a weather skill may involve a weather skill component providing weather information to the remote system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 890 may implement different types of skills and may optionally be in communication with one or more skill system(s) 125. The skill system(s) 125 may each correspond to a particular skill component 890 and may be capable of performing operations to ultimately execute an action. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. In some instances, skill component(s) 890 or a skill system(s) 125 may provide output text data responsive to the present user command.

The remote system 120 may communicate with one or more skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the remote system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The remote system 120 may include a TTS component 880. The TTS component 880 may generate audio data (e.g., synthesized speech) from text data using one or more different methods. Text data input to the TTS component 880 may come from a skill system 125, the orchestrator component 830, or another component of the system 100.

In one method of synthesis called unit selection, the TTS component 880 matches text data against a database of recorded speech. The TTS component 880 selects matching units of recorded speech and concatenates the units together to form audio data. In another method of synthesis called parametric synthesis, the TTS component 880 varies parameters such as frequency, volume, and noise to generate audio data including an artificial speech waveform. Parametric synthesis uses a computerized voice generator, sometimes called a vocoder.

The remote system 120 may include a user recognition component 895. In at least some examples, the user recognition component 895 may be implemented as a skill system 125.

The user recognition component 895 may recognize one or more users using various data. The user recognition component 895 may take as input the audio data 811 and/or the text data 813. The user recognition component 895 may perform user recognition (e.g., user recognition processing) by comparing speech characteristics, in the audio data 811, to stored speech characteristics of users. The user recognition component 895 may additionally or alternatively perform user recognition by comparing biometric data (e.g., fingerprint data, iris data, etc.), received by the remote system 120 in correlation with a natural language input, to stored biometric data of users. The user recognition component 895 may additionally or alternatively perform user recognition by comparing image data (e.g., including a representation of at least a feature of a user), received by the remote system 120 in correlation with a natural language input, with stored image data including representations of features of different users. The user recognition component 895 may perform other or additional user recognition processes, including those known in the art. For a particular natural language input, the user recognition component 895 may perform processing with respect to stored data of users associated with the device 110 that captured the natural language input.

The user recognition component 895 determines whether a natural language input originated from a particular user. For example, the user recognition component 895 may generate a first value representing a likelihood that a natural language input originated from a first user, a second value representing a likelihood that the natural language input originated from a second user, etc. The user recognition component 895 may also determine an overall confidence regarding the accuracy of user recognition operations.

The user recognition component 895 may output a single user identifier corresponding to the most likely user that originated the natural language input. Alternatively, the user recognition component 895 may output multiple user identifiers (e.g., in the form of an N-best list) with respective values representing likelihoods of respective users originating the natural language input. The output of the user recognition component 895 may be used to inform NLU processing, processing performed by a skill system 125, as well as processing performed by other components of the remote system 120 and/or other systems.

The remote system 120 may include profile storage 870. The profile storage 870 may include a variety of information related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 870 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the remote system 120 with permission to allow the skill system 125 to execute with respect to the user's natural language inputs. If a user does not enable a skill system 125, the remote system 120 may not invoke the skill system 125 to execute with respect to the user's natural language inputs.

The profile storage 870 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 870 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

While the above description refers to an example in which the remote system 120 performs speech processing for the device 110*b*, the disclosure is not limited thereto. In some examples, the device 110*b* may perform some level of speech processing locally on the device 110*b* without departing from the disclosure. For example, the device 110*b* may include some or all of the components illustrated in FIG. 8 and may be configured to perform some or all of the steps described above with regard to the remote system 120. Thus, the system 100 may perform speech processing using the device 110, the remote system 120, and/or a combination thereof (e.g., perform some steps using the device 110 and other steps using the remote system 120) without departing from the disclosure.

Figure 9:
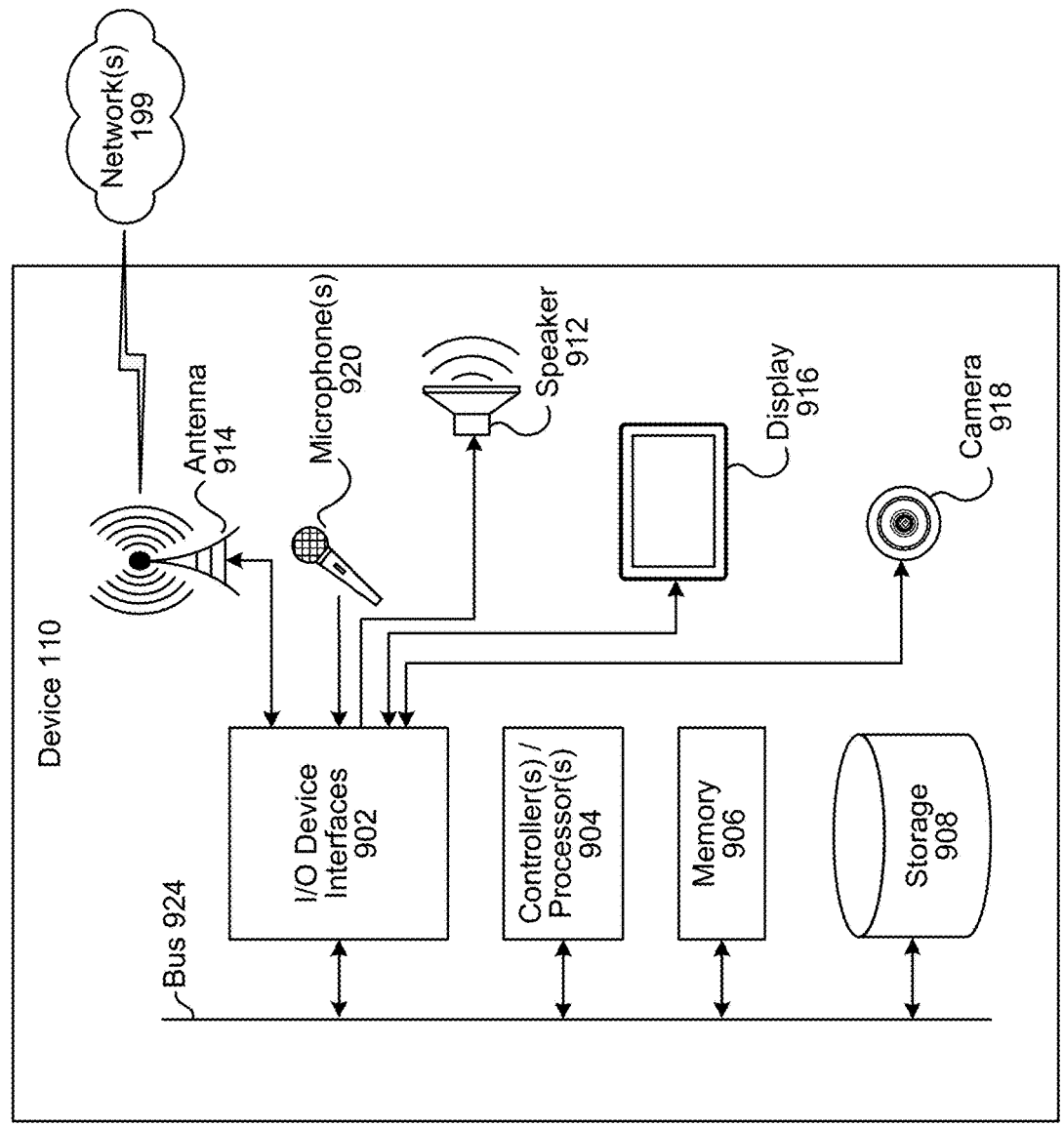
FIG. 9 is a block diagram conceptually illustrating example components of a device according to embodiments of the present disclosure.

FIG. 9 is a block diagram conceptually illustrating a device 110 that may be used with the system. FIG. 10 is a block diagram conceptually illustrating example components of a remote system 120, such as a natural language processing system(s), which may assist with natural language processing such as automatic speech recognition (ASR) processing, natural language understanding (NLU) processing, and/or the like. Multiple remote systems 120 may be included in the overall system 100 of the present disclosure, such as one or more natural language processing systems for performing ASR processing, one or more natural language processing systems for performing NLU processing, etc. In operation, each of these systems may include computer-readable and computer-executable instructions that reside on the respective system 120, as will be discussed further below.

A remote system 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Each device 110 and/or system 120 may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device 110 and/or system 120 may also include a data storage component (908/1008) for storing data and controller/processor-executable instructions. Each data storage component (908/1008) may individually include one or more non-volatile storage types such as magnetic storage, optical storage, solid-state storage, etc. Each device 110 and/or system 120 may also be connected to removable or external non-volatile memory and/or storage (such as a removable memory card, memory key drive, networked storage, etc.) through respective input/output device interfaces (902/1002).

Computer instructions for operating each device 110 and/or system 120 and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device 110 and/or system 120 includes input/output device interfaces (902/1002). A variety of components may be connected through the input/output device interfaces (902/1002), as will be discussed further below. Additionally, each device 110 and/or system 120 may include an address/data bus (924/1024) for conveying data among components of the respective device. Each component within a device 110 and/or system 120 may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio.

The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content and/or a camera 918 to capture image data, although the disclosure is not limited thereto.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110 and the remote system 120 may include their own dedicated processors, memory, and/or storage. Alternatively, one or more of the components of the device(s) 110 and/or the remote system 120 may utilize the I/O interfaces (902/1002), processor(s) (904/1004), memory (906/1006), and/or storage (908/1008) of the device(s) 110 and remote system 120, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device(s) 110 and the remote system 120, as described herein, are illustrative, and may be located as a stand-alone device or may be included, in whole or in part, as a component of a larger device or system.

As illustrated in FIG. 11, multiple devices (110a-110h, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a speech-detection device 110b, refrigerator 110c, display device 110d, a smart television 110e, a display device 110f, a headless device 110g (e.g., configured to connect to a television), and/or a device 110h, may be connected to the network(s) 199 through a wireless service provider (e.g., using a WiFi or cellular network connection), over a wireless local area network (WLAN) (e.g., using WiFi or the like), over a wired connection such as a local area network (LAN), and/or the like. Other devices are included as network-connected support devices, such as the remote system 120 and/or other devices (not illustrated). The support devices may connect to the network(s) 199 through a wired connection or wireless connection. The devices 110 may capture audio using one-or-more built-in or connected microphones or other audio capture devices, with processing performed by ASR components, NLU components, or other components of the same device or another device connected via the network(s) 199, such as an ASR component, NLU component 260, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
receiving first audio data corresponding to at least one microphone associated with a device;
performing feature extraction to generate first data representing audio features of the first audio data;
generating, using the first data and a first recurrent neural network (RNN), second data indicating first audio frames of the first audio data that represent speech and second audio frames of the first audio data that do not represent speech, the second data representing temporal features associated with the audio features;
processing, using at least one convolution layer that applies one or more convolution filters, the second data to generate third data, the third data representing spatial features associated with the audio features;
processing the third data using a trained model to generate fourth data, wherein the fourth data:
indicates that a first utterance is represented in a first portion of the first audio data,
indicates a beginning of the first portion of the first audio data,
indicates an ending of the first portion of the first audio data, and
includes a first score indicating a likelihood that the first portion of the first audio data represents the first utterance;
generating second audio data including the first portion of the first audio data; and
causing speech processing to be performed on the second audio data.

2. The computer-implemented method of claim 1, wherein processing the third data using the trained model further comprises:
determining, using the third data and a regression layer of the trained model, the beginning of the first portion of the first audio data;
determining, using the third data and the regression layer of the trained model, the ending of the first portion of the first audio data; and
determining, using the third data and a sigmoid layer of the trained model, the first score.

3. The computer-implemented method of claim 1, wherein processing the third data using the trained model further comprises:
determining, using a first portion of the third data and a first layer of the trained model, a beginning of the first utterance;
determining, using the first portion of the third data and a second layer of the trained model, a second score indicating a likelihood that a second portion of the first audio data represents the first utterance, the second portion of the first audio data corresponding to a first segment of the first portion of the first audio data;
determining, using a second portion of the third data and the second layer of the trained model, a third score indicating a likelihood that a third portion of the first audio data represents the first utterance, the third portion of the first audio data corresponding to the first segment and a second segment of the first portion of the first audio data;
determining, using a third portion of the third data and the first layer of the trained model, an ending of the first utterance; and
determining, using the third portion of the third data and the second layer of the trained model, the first score.

4. The computer-implemented method of claim 1, further comprising:
processing the third data using the trained model to generate fifth data, wherein the fifth data:
indicates that a second utterance is represented in a second portion of the first audio data, the second portion of the first audio data being subsequent to the first portion of the first audio data,
indicates a beginning of the second portion of the first audio data, the beginning of the second portion of the first audio data corresponding to a first audio frame of the first audio frames that is immediately preceded by a second audio frame of the first audio frames that corresponds to the ending of the first portion of the first audio data,
indicates an ending of the second portion of the first audio data, and
includes a second score indicating a likelihood that the second portion of the first audio data represents the second utterance.

5. A computer-implemented method, the method comprising:
receiving input audio data corresponding to at least one microphone associated with a device;
generating, using the input audio data, first data representing audio features corresponding to the input audio data;
generating, using the first data and a recurrent neural network (RNN), second data indicating first audio frames of the input audio data that represent speech;
generating, using the second data and one or more convolution filters, third data, the third data representing spatial features associated with the audio features; and
processing the third data to generate fourth data, wherein the fourth data:
indicates that a first utterance is represented in a first portion of the input audio data,
indicates a beginning of the first portion of the input audio data,
indicates an ending of the first portion of the input audio data, and
includes a first score indicating a likelihood that the first portion of the input audio data represents the first utterance.

6. The computer-implemented method of claim 5, wherein processing the third data to generate the fourth data further comprises:
determining, using the third data and a regression layer, the beginning of the first portion of the input audio data;
determining, using the third data and the regression layer, the ending of the first portion of the input audio data; and
generating a portion of the fourth data indicating the beginning of the first portion of the input audio data and the ending of the first portion of the input audio data.

7. The computer-implemented method of claim 5, wherein processing the third data to generate the fourth data further comprises:
determining, using the third data and a first layer of a trained model, the beginning and the ending of the first portion of the input audio data; and determining, using the third data and a second layer of the trained model, the first score.

8. The computer-implemented method of claim 5, wherein processing the third data to generate the fourth data further comprises:
    determining, using the second data, the third data, and a first layer of a trained model, the beginning and the ending of the first portion of the input audio data; and
    determining, using the second data, the third data, and a second layer of the trained model, the first score.

9. The computer-implemented method of claim 5, wherein processing the third data to generate the fourth data further comprises:
    determining, using a first portion of the third data and a first layer of a trained model, a beginning of the first utterance;
    determining, using the first portion of the third data and a second layer of the trained model, a second score indicating a likelihood that a second portion of the input audio data represents the first utterance, the second portion of the input audio data corresponding to a first segment of the first portion of the input audio data;
    determining, using a second portion of the third data and the second layer of the trained model, a third score indicating a likelihood that a third portion of the input audio data represents the first utterance, the third portion of the input audio data corresponding to the first segment and a second segment of the first portion of the input audio data;
    determining, using a third portion of the third data and the first layer of the trained model, an ending of the first utterance; and
    determining, using the third portion of the third data and the second layer of the trained model, the first score.

10. The computer-implemented method of claim 5, wherein generating the second data further comprises:
    receiving, by one or more long short-term memory (LSTM) layers of the RNN, the first data, wherein the audio features represented by the first data correspond to filterbank energy (FBE) features; and
    processing the first data using the one or more LSTM layers to generate the second data.

11. The computer-implemented method of claim 5, wherein generating the second data further comprises:
    receiving, by one or more long short-term memory (LSTM) layers of the RNN, the first data and the input audio data, wherein the audio features represented by the first data correspond to filterbank energy (FBE) features; and
    processing the first data and the input audio data using the one or more LSTM layers to generate the second data.

12. The computer-implemented method of claim 5, further comprising:
    processing the third data to generate fifth data, wherein the fifth data:
        indicates that a second utterance is represented in a second portion of the input audio data, the second portion of the input audio data being subsequent to the first portion of the input audio data,
        indicates a beginning of the second portion of the input audio data, the beginning of the second portion of the input audio data corresponding to a first audio frame of the first audio frames that is immediately preceded by a second audio frame of the first audio frames that corresponds to the ending of the first portion of the input audio data,
        indicates an ending of the second portion of the input audio data, and
        includes a second score indicating a likelihood that the second portion of the input audio data represents the second utterance.

13. The computer-implemented method of claim 5, further comprising:
    determining, using the fourth data, output audio data that corresponds to the first portion of the input audio data; and
    causing speech processing to be performed on the output audio data.

14. The computer-implemented method of claim 5, further comprising:
    determining, using the fourth data, feature vector data that corresponds to a portion of the first data that represents the first utterance; and
    causing speech processing to be performed on the feature vector data.

15. The computer-implemented method of claim 5, further comprising:
    processing the third data to generate the fourth data, wherein the fourth data further indicates that a second utterance is represented in a second portion of the input audio data, the second utterance overlapping with the first utterance in the input audio data.

16. A system comprising:
    at least one processor; and
    memory including instructions operable to be executed by the at least one processor to cause the system to:
        receive input audio data corresponding to at least one microphone associated with a device;
        generate, using the input audio data, first data representing audio features corresponding to the input audio data;
        generate, using the first data and a recurrent neural network (RNN), second data indicating first audio frames of the input audio data that represent speech;
        generate, using the second data and one or more convolution filters, third data, the third data representing spatial features associated with the audio features; and
        process the third data to generate fourth data, wherein the fourth data:
            indicates that a first utterance is represented in a first portion of the input audio data,
            indicates a beginning of the first portion of the input audio data,
            indicates an ending of the first portion of the input audio data, and
            includes a first score indicating a likelihood that the first portion of the input audio data represents the first utterance.

17. The system of claim 16, wherein the memory further comprises instructions that, when executed by the at least one processor, further cause the system to:
    determine, using the third data and a regression layer, the beginning of the first portion of the input audio data;
    determine, using the third data and the regression layer, the ending of the first portion of the input audio data; and
    generate a portion of the fourth data indicating the beginning of the first portion of the input audio data and the ending of the first portion of the input audio data.

18. The system of claim 16, wherein the memory further comprises instructions that, when executed by the at least one processor, further cause the system to:

determine, using the third data and a first layer of a trained model, the beginning and the ending of the first portion of the input audio data; and determine, using the third data and a second layer of the trained model, the first score.

19. The system of claim 16, wherein the memory further comprises instructions that, when executed by the at least one processor, further cause the system to:

determine, using a first portion of the third data and a first layer of a trained model, a beginning of the first utterance;

determine, using the first portion of the third data and a second layer of the trained model, a second score indicating a likelihood that a second portion of the input audio data represents the first utterance, the second portion of the input audio data corresponding to a first segment of the first portion of the input audio data;

determine, using a second portion of the third data and the second layer of the trained model, a third score indicating a likelihood that a third portion of the input audio data represents the first utterance, the third portion of the input audio data corresponding to the first segment and a second segment of the first portion of the input audio data;

determine, using a third portion of the third data and the first layer of the trained model, an ending of the first utterance; and determine, using the third portion of the third data and the second layer of the trained model, the first score.

20. The system of claim 16, wherein the memory further comprises instructions that, when executed by the at least one processor, further cause the system to:

receive, by one or more long short-term memory (LSTM) layers of the RNN, the first data, wherein the audio features represented by the first data correspond to filterbank energy (FBE) features; and process the first data using the one or more LSTM layers to generate the second data.

21. The system of claim 16, wherein the memory further comprises instructions that, when executed by the at least one processor, further cause the system to:

process the third data to generate fifth data, wherein the fifth data:

indicates that a second utterance is represented in a second portion of the input audio data, the second portion of the input audio data being subsequent to the first portion of the input audio data, indicates a beginning of the second portion of the input audio data, the beginning of the second portion of the input audio data corresponding to a first audio frame of the first audio frames that is immediately preceded by a second audio frame of the first audio frames that corresponds to the ending of the first portion of the input audio data, indicates an ending of the second portion of the input audio data, and includes a second score indicating a likelihood that the second portion of the input audio data represents the second utterance.

\* \* \* \* \*